(12) United States Patent
Liao et al.

(10) Patent No.: US 12,400,116 B2
(45) Date of Patent: Aug. 26, 2025

(54) APPARATUS, METHOD AND COMPUTER PROGRAM FOR ACCELERATING GRID-OF-BEAMS OPTIMIZATION WITH TRANSFER LEARNING

(71) Applicant: NOKIA TECHNOLOGIES OY, Espoo (FI)

(72) Inventors: Qi Liao, Stuttgart (DE); Fahad Syed Muhammad, Orsay (FR); Veronique Capdevielle, Magny les Hameaux (FR); Afef Feki, Sceaux (FR); Suresh Kalyanasundaram, Bangalore (IN); Ilaria Malanchini, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 455 days.

(21) Appl. No.: 17/928,712

(22) PCT Filed: May 26, 2021

(86) PCT No.: PCT/EP2021/064010
§ 371 (c)(1),
(2) Date: Nov. 30, 2022

(87) PCT Pub. No.: WO2021/244912
PCT Pub. Date: Dec. 9, 2021

(65) Prior Publication Data
US 2023/0214648 A1 Jul. 6, 2023

(30) Foreign Application Priority Data
Jun. 1, 2020 (FI) .................................... 20205565

(51) Int. Cl.
*G06N 3/08* (2023.01)
*G06N 3/045* (2023.01)
*H04B 7/06* (2006.01)

(52) U.S. Cl.
CPC ............... *G06N 3/08* (2013.01); *G06N 3/045* (2023.01); *H04B 7/0617* (2013.01)

(58) Field of Classification Search
CPC .......... G06N 3/08; G06N 3/045; G06N 3/082; G06N 20/00; H04B 7/0617; H04B 7/0482; H04B 7/0695; H04W 24/02
(Continued)

(56) References Cited

U.S. PATENT DOCUMENTS

2018/0268292 A1* 9/2018 Choi .................... G06V 10/454
2020/0134469 A1* 4/2020 Choo ..................... G06N 3/045
(Continued)

FOREIGN PATENT DOCUMENTS

WO 2020/055408 A1 3/2020

OTHER PUBLICATIONS

Hinton, "Distilling the Knowledge in a Neural Network", arXiv:1503.02531v1, Mar. 9, 2015 (Year: 2015).*
(Continued)

*Primary Examiner* — Juan A Torres
(74) *Attorney, Agent, or Firm* — SQUIRE PATTON BOGGS (US) LLP

(57) ABSTRACT

A deep transfer reinforcement learning (DTRL) method based on transfer learning within a deep reinforcement learning (DRL) framework is provided to accelerate the GoB optimization decisions when experiencing environment changes in the same source radio network agent or when being applied from a source radio network agent to a target radio network agent. The transferability of the knowledge embedded in a pre-trained neural network model as a Q-approximator is exploited, and a mechanism to transfer parameters from a source agent to a target agent is provided, where the transferability criterion is based on the similarity measure between the source and target domain.

17 Claims, 16 Drawing Sheets

(58) Field of Classification Search
USPC .................................................. 455/414.1
See application file for complete search history.

(56) References Cited

U.S. PATENT DOCUMENTS

2020/0311540 A1* 10/2020 Chakraborty ............ G06N 3/08
2020/0334538 A1* 10/2020 Meng ...................... G10L 15/16

OTHER PUBLICATIONS

International Search Report and Written Opinion dated Dec. 10, 2021 corresponding to International Patent Application No. PCT/EP2021/064010.
"Zero Touch Network and Service Management (ZSM); Means of Automation," Draft ETSI GR ZSM-005 V0.4.0 (Feb. 2020), Group Report, ETSI Draft Specification, Feb. 19, 2020, pp. 1-79, XP014366225.
Dor Livne et al., "PoPS: Policy Pruning and Shrinking for Deep Reinforcement Learning," IEEE Journal of Selected Topics in Signal Processing, vol. 14, No. 4, Jan. 16, 2020, pp. 789-801, XP011805147.
Andrei A. Rusu et al., "Policy Distillation," Under review as a conference paper at ICLR 2016, arXiv:1511.06295v2, Jun. 7, 2016, XP055497611.
Faris B. Mismar et al., "Deep Reinforcement Learning for 5G Networks: Joint Beamforming, Power Control, and Interference Coordination," IEEE Transactions on Communications, vol. 68, No. 3, Dec. 23, 2019, pp. 1581-1592, XP011779494.
Shinji Watanabe et al., "Student-Teacher Network Learning with Enhanced Features," 2017 IEEE International Conference on Acoustics, Speech and Signal Processing (ICASSP), IEEE, Mar. 5, 2017, pp. 5275-5279, XP033259417.
Junho Yim et al., "A Gift from Knowledge Distillation: Fast Optimization, Network Minimization and Transfer Learning," 2017 IEEE Conference on Computer Vision and Pattern Recognition, Jul. 21, 2017, pp. 7130-7138, XP033250080.
3GPP TR 36.897 V13.0.0 (Jun. 2015), Technical Report, 3rd Generation Partnership Project; Technical Specification Group Radio Access Network; Study on elevation beamforming / Full-Dimension (FD) Multiple Input Multiple Output (MIMO) for LTE (Release 13), Jun. 2015.

* cited by examiner

APPARATUS, METHOD AND COMPUTER PROGRAM FOR ACCELERATING GRID-OF-BEAMS OPTIMIZATION WITH TRANSFER LEARNING

FIELD OF THE INVENTION

Various example embodiments relate to mobile or wireless telecommunication systems, and in particular to transfer learning for accelerating grid-of-beams optimization.

BACKGROUND

Examples of mobile or wireless telecommunication systems may include the universal mobile telecommunications system (UMTS) terrestrial radio access network (UTRAN), long term evolution (LTE) evolved UTRAN (E-UTRAN), LTE-advanced (LTE-A), LTE-A Pro, and/or fifth generation (5G) radio access technology (RAT) or new radio (NR) access technology. 5G or NR wireless systems refer to the next generation (NG) of radio systems and network architecture. 5G is mostly built on a NR, but the 5G (or NG) network can also build on E-UTRA radio. It is estimated that NR will provide bitrates on the order of 10-20 Gbit/s or higher and will support at least enhanced mobile broadband (eMBB) and ultra-reliable low-latency-communication (URLLC). NR is expected to deliver extreme broadband and ultra-robust, low latency connectivity and massive networking to support the Internet of things (IoT). With IoT and machine-to-machine (M2M) communication becoming more widespread, there will be a growing need for networks that meet the needs of lower power, low data rate, and long battery life. It is noted that a node that can provide in 5G or NR radio access functionality to a user equipment (UE) (i.e., similar to Node B in E-UTRAN or eNB in LTE) or that can support 5G or NR as well as connectivity to next generation core (also denoted as NGC or 5GC) may be referred to as a next generation or 5G Node B (also denoted as gNB or 5G NB).

SUMMARY

According to an example embodiment, there is provided a method comprising: providing at a source domain, a pre-trained neural network model within a source agent and within a source environment, with an input beam feature, the pre-trained neural network model comprising a first set of layers and a second set of layers; when the source environment has been changed into a target environment, reusing, at a target domain, the first set of layers within the source agent; when a knowledge of the source agent is to be transferred to a target agent, transferring a predetermined number of layers amongst the first set of layers within the source agent at the source domain to the target agent at the target domain; determining whether, for the target domain, to maintain the second set of layers from the source domain or modify the second set of layers from the source domain or replace the second set of layers from the source domain with a third set of layers; and in response to said determining, training at the target domain, either the maintained second set of layers or the modified second set of layers or the third set of layers, using collected data from at least the target domain. The pre-trained neural network model has been previously trained to learn a non-discounted cumulative reward $Q(s, a)$ to evaluate a benefit of including a given beam into a grid-of-beams (GoB), where the term "s" denotes a state indicating a status of a grid-of-beams (GoB) in terms of selected and non-selected beams in the grid-of-beams (GoB) under construction and the term "a" denotes an action corresponding to a selection of one additional beam from an universal beam set U; the pre-trained neural network model is applied to select at least one beam to include in the grid-of-beams (GoB) to optimize or maximize a performance metric; and the pre-trained neural network model is repeatedly applied until a required number of beams for the grid-of-beams is selected.

The predetermined number of layers to be transferred among the first set of layers may be determined based on a similarity analysis between environment features at the source domain and at the target domain.

Said determining may comprise a heuristic determination; and said maintaining the second set of layers from the source domain may comprise reusing all layers of the second set of layers, and said modifying the second set of layers from the source domain may comprise modifying at least one layer of the second set of layers, and/or removing at least one layer of the second set of layers, and/or adding at least one layer to the second set of layers.

The first set of layers may comprise low and medium layers and the second set of layers may comprise high layers.

Each layer of the pre-trained neural network model may respectively be defined by a set of parameters and hyper-parameters.

The environment features may comprise at least one of a temporal traffic distribution, a spatial traffic distribution and received spatially dependent antenna gains from the beams.

According to another example embodiment, there is provided a method comprising: providing at a source domain, a pre-trained neural network model with at least an input beam feature and an input environment feature; modifying structurally the pre-trained neural network model depending on a format of the input beam and environment features, as to obtain a teacher model at the source domain; training the teacher model using at least the input beam and environment features from the source domain, as to obtain a trained teacher model; constructing a smaller pre-trained neural network model as a student model; training the student model, as to obtain a trained student model, using at least the input beam and environment features from the source domain and an output of the trained teacher model, to mimic the output of the trained teacher model; and fine-tuning the trained student model using at least input beam and environment features from a target domain. The pre-trained neural network model has been previously trained to learn a non-discounted cumulative reward $Q(s, a)$ to evaluate a benefit of including a given beam into a grid-of-beams (GoB), where the term "s" denotes a state indicating a status of a grid-of-beams (GoB) in terms of selected and non-selected beams in the grid-of-beams (GoB) under construction and the term "a" denotes an action corresponding to a selection of one additional beam from an universal beam set U; the pre-trained neural network model is applied to select at least one beam to include in the grid-of-beams (GoB) to optimize or maximize a performance metric; and the pre-trained neural network model is repeatedly applied until a required number of beams for the grid-of-beams is selected.

To mimic the output of the trained teacher model may comprise minimizing at least one loss function between the trained teacher model and the student model using the input beam and environment features from the source domain and the output of the trained teacher model.

The loss function may comprise at least a model similarity transfer loss.

Said fine-tuning the trained student model may comprise at least: training a selected number of last layers of the trained student model using the input beam and environment features from the target domain, and jointly minimizing the model similarity transfer loss and a deep Q-network (DQN) approximation loss between the trained teacher model and the trained student model.

The number of last layers to be trained may be selected using a similarity analysis between the source domain and the target domain.

The input beam feature and the input environment feature may have a different format or a similar format with a size being either similar or different.

The format may be one of at least a vector and an image and/or a matrix.

The input environment feature may comprise at least one of a temporal traffic distribution, a spatial traffic distribution and received spatially dependent antenna gains from the beams.

The pre-trained neural network model may have been previously trained using collected network data and/or simulated data from a network simulator.

According to another example embodiment, there is provided an apparatus comprising at least one processor and at least one memory comprising computer program code, wherein the at least one memory and the computer program code are configured, with the at least one processor, to cause the apparatus at least to perform any of the preceding or above methods.

According to another example embodiment, there is provided an apparatus comprising means for performing any of the preceding or above methods.

According to another example embodiment, there is provided a computer readable medium comprising program instructions stored thereon for performing any of the preceding or above methods.

According to another example embodiment, there is provided a computer program comprising computer executable code which, when run on at least one processor, may be configured to cause an apparatus to perform any of the preceding or above methods.

According to another example embodiment, there is provided a non-transitory computer readable medium comprising program instructions stored thereon for performing any of the preceding or above methods.

According to an aspect, there is provided a non-volatile tangible memory medium comprising program instructions stored thereon for performing any of the preceding or above methods.

According to an aspect, there is provided an apparatus comprising circuitry configured to perform any of the preceding or above methods.

In the above, many different example embodiments have been described. It should be appreciated that further example embodiments may be provided by the combination of any two or more of the example embodiments described above.

Various other example embodiments are also described in the following detailed description and in the attached claims.

BRIEF DESCRIPTION OF THE DRAWINGS

Some example embodiments will now be described with reference to the following accompanying drawings.

DETAILED DESCRIPTION

Figure 1:
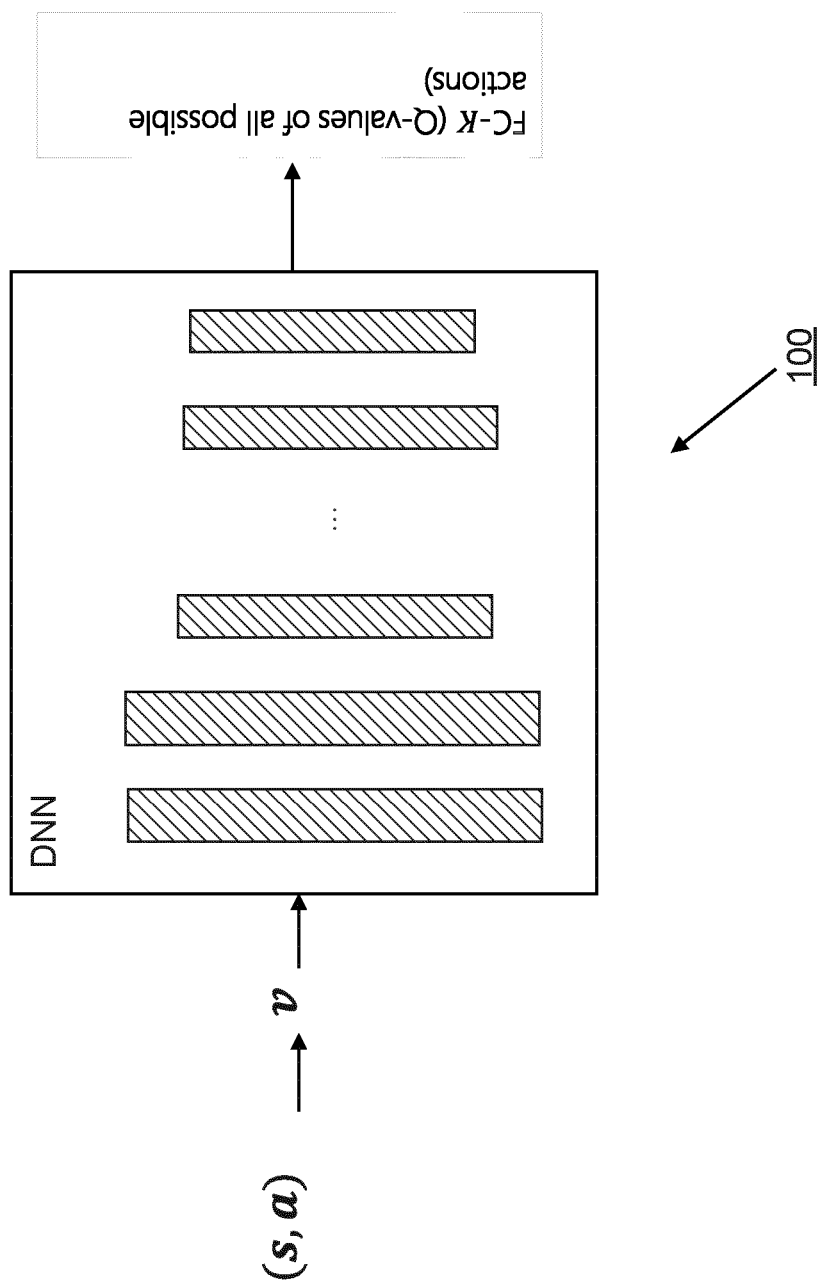
FIG. 1 shows an example embodiment of a pre-trained DRL model comprising a pre-trained DNN model as a Q-approximator.

Multi-user multiple-input multiple-output (MU-MIMO) and massive MIMO are the key enablers for the 5G radio access technology and NR access technology to improve the wireless network capacity without requiring more spectrum. In MU-MIMO, base station (BS) sends multiple data streams, one or more per user, using the same time-frequency resources. In massive MIMO, the number of antennas in a BS needs to be larger than the aggregate number of layers per UE, summed over all the co-scheduled UEs receiving a given time-frequency resource. More specifically, M active antenna elements of an antenna array transmit $\Sigma_i N_i$ distinct streams of data via $\Sigma_i N_i$ logical antenna ports, $N_i$ streams for UE i, with $M \gg \Sigma_i N_i$.

However, with the increase in the number of antennas, the overhead of channel estimation becomes high and the required number of baseband chains increases with the number of data streams being transmitted simultaneously. Grid-of-beams (GoB), as defined for example in 3GPP TR 36.897 v13.0.0, has been proposed to subdivide the cells into radial subsectors by a limited set of fixed beams, this limits the number of effective wireless channels and thereby the overhead for channel estimation and reporting, achieve a sparse channel matrix and more efficient use of baseband chains.

The GoB beam set may also be used as the so-called synchronization signals burst (SSB) beams to aid initial access and broadcast transmissions. The actual data transmission need not necessarily use the GoB beams. In this case, an optimal design of GoB beams may be needed for good coverage and initial access.

The conventional approach of GoB optimization consists in searching the best combinations of beams from a dictionary of beams with different characteristics (steering directions and beamwidth) via exhaustive or sequential search. Due to the large search space, such methods may be computationally prohibitive and become a source of overhead. To improve the search efficiency, a machine learning approach to GoB optimization is proposed in WO 2020/055408 A1 by using a deep Q-network (DQN) framework. The idea is to approximate the cumulative reward Q-value function corresponding to certain action of including a beam into a GoB by training a neural network model. The trained neural network model is repeatedly applied until a required number of beams for GoB is selected. Although the proposed deep reinforcement learning (DRL)-based solution in WO 2020/055408 A1 can improve the searching efficiency, it has the drawback of being less flexible to adapt to a changing network environment. When the network environment changes, e.g., in terms of traffic distribution and/or channel propagation/condition, and/or when the GoB is to be optimized for another cell site, the trained neural network model as the trained DRL model may need to be retrained to adapt to the new environment and/or the other cell site. In particular, the trained DRL model needs to be retrained if the environment changes because the trained DRL model cannot learn changes to the environment that it has not yet sampled.

Thus, a challenge that arises may relate to how to apply and adapt such a global GoB optimization to any network/traffic condition changes and to accelerate the global GoB optimization based on the learning of the resulting new environment with less training data, while leveraging the knowledge previously learned by such a trained neural network model or trained DRL model, also interchangeably designated hereafter as a pre-trained neural network model or a pre-trained DRL model.

To meet the aforementioned challenge, the "transferability" of the knowledge embedded in the pre-trained neural network model will be exploited through transfer learning in the present disclosure.

Referring to WO 2020/055408 A1, the pre-trained neural network model has been previously trained to learn a non-discounted cumulative reward Q (s, a) to evaluate a benefit of including a given beam into a GoB, where the term "s" denotes a state indicating a status of a GoB in terms of selected and non-selected beams in the GoB under construction and the term "a" denotes an action corresponding to a selection of one additional beam from a universal beam set $\mathcal{U}$. Then, the pre-trained neural network model may be applied to select at least one beam to include in the GoB to optimize or maximize a performance metric and be repeatedly applied until a required number of beams for the grid-of-beams is selected. The performance metric to be optimized or maximized may include at least a traffic-density weighted beamforming gain, a geometric mean of beamforming gains, a minimum reference signal received power (RSRP) for coverage optimization, and so on.

Table I gathers some notations or variables used in the following along with their respective definition.

TABLE I

Notations and definitions

| Notation | Definition |
| --- | --- |
| s | Cell site-radio scenario $s \in \mathcal{S}$ |
| $\mathcal{N}_s$ | Set of cuboids on cell site s. Each cuboid indicates a 3D position served by the cell site s. We have $\mathcal{N}_s := \{(x_n, y_n, z_n): n = 1, 2, \ldots, N_s\}$, where $N_s$ is the total number of cuboids served by site s |
| $\mathcal{U}$ | Universal beam set $\mathcal{U} = \{B_1, B_2, \ldots, B_K\}$ where $B_k$ denotes the k-th beam (precoding matrix) in the beam set |
| $\mathcal{B}_s$ | A set of beams included in the GoB for cell site s, $\mathcal{B}_s \subseteq \mathcal{U}$ |
| $\rho(x, y, z)$ | Traffic spatial density measure (e.g., spatial probability distribution of the traffic) on the cuboid with position (x, y, z) |
| $G_k(x, y, z)$ | Beamforming gain of the k-th beam at the spatial cuboid with position (x, y, z) |
| $\mathcal{G}(\mathcal{N}_s, \mathcal{U})$ | A set of beamforming gains for all beams over all cuboids $\mathcal{G}(\mathcal{N}_s, \mathcal{U}) := (G_{k,n}: k = 1, \ldots, K; n = 1, \ldots, N_s)$ |

A state may be defined in the following as a current set of selected beams and their properties, e.g., narrow beams or wide beams. With a slight abuse of the notation, the state is denoted by "s".

An action may be defined in the following as a beam to be selected next. Let a denote the action of selecting a beam and B(a) the beam selected by action a.

In a first option, a reward r(s, a) may be defined as returning the increase of the traffic-density weighted beamforming gain achieved by adding a beam B(a) into the current GoB set $\mathcal{B}_s$, by the following relationship:

$$r(s, a) = \sum_{(x,y,z)} \rho(x, y, z) \left( \max_{B_k \in \mathcal{B}_s \cup \{B(a)\}} G_k(x, y, z) - \max_{B_k \in \mathcal{B}_s} G_k(x, y, z) \right) \quad (1)$$

In a second option, a reward r(s, a) may be defined as the increase of the minimum RSRP over all positions in the cell site achieved by adding a beam B(a) into the current GoB set $\mathcal{B}_s$, by the following relationship:

$$r(s, a) = \min_{(x,y,z)} \max_{B_k \in \mathcal{B}_s \cup \{B(a)\}} RSRP_k(x, y, z) - \min_{(x,y,z)} \max_{B_k \in \mathcal{B}_s} RSRP_k(x, y, z) \quad (2)$$

wherein the RSRP value served by the best beam among all selected beams in GoB is considered at each location. This reward function helps improve the cell coverage by optimizing the minimum RSRP over the space.

In a third option, a reward r(s, a) may be defined a logarithmic projection from the geometric mean of the beamforming gains to achieve a fair allocation of the beamforming gains across the cell, by the following relationship:

$$r(s, a) = \qquad (3)$$
$$\sum_{(x,y,z)} \rho(x, y, z) \left( \max_{B_k \in \mathcal{B}_s \cup \{B(a)\}} \log G_k(x, y, z) - \max_{B_k \in \mathcal{B}_s} \log G_k(x, y, z) \right)$$

The objective is to find the policy $\pi^*(s^0)$ to maximize the expected non-discounted cumulative reward, i.e., the $N_B$-step cumulative reward, as defined by the following relationship:

$$\pi^*(s^0) = \text{maximize}_{(a_0, a_1, a_2, \ldots, a_{N_B-1})} \sum_{k=0}^{N_B-1} r(s_t, a_t) \quad (4)$$

A neural network is used to approximate the Q-function that satisfies, for any state-action pair (s, a), the following Bellman equation:

$$Q(s,a;\theta) \approx Q^*(s,a) \quad (5)$$

where $$Q^*(s, a) = \mathbb{E}_{s' \in \mathcal{E}}\left[r + \gamma \max_{a'} Q^*(s', a') \mid s, a\right],$$

$\mathcal{E}$ is the probability distribution of the next action s' and $\gamma=1$ since a non-discounted cumulative reward is targeted.

The update of the weight $\theta$ is computed as follows:

$$\theta_{t+1} = \theta_t + \alpha\left(r_{t+1} + \max_a Q(s_{t+1}, a; \theta_t) - Q(s_t, a_t; \theta_t)\right) \nabla_{\theta_t} Q(s_t, a_t; \theta_t) \quad (6)$$

where $\alpha$ is scalar step size and $r_{t+1}$ is the immediate reward. This update resembles stochastic gradient descent, updating the current value $Q(s_t, a_t; \theta_t)$ towards a target value $$r_{t+1} + \max_a Q(s_{t+1}, a; \theta_t).$$

The environment is featured by the spatial distribution of the traffic p(x, y, z) for each $(x_n, y_n, z_n) \in \mathcal{N}_S$ and the antenna gains $G_k(x, y, z)$ for all k=1, . . . , K and $(x_n, y_n, z_n) \in \mathcal{N}_S$. Moreover, to capture the time-vary pattern, the possibility to generalize the traffic distribution from solely spatial traffic distribution to joint spatial-temporal traffic distribution may additionally be introduced to further feature the environment.

One option to reduce the joint state-action space and to convert the state-action pair (s, a) into the presentable form as inputs of the pre-trained DRL model is to map the state-action pair to an extracted feature vector $v \in \mathbb{R}^n$ and the Q function is approximated as $\hat{Q}(v; \theta)$. For example, one or more of the following may be chosen as the feature vector for a given state s and action a: beam pointing directions, beamwidths, and/or maximum beamforming gain in azimuth and elevation, etc.

The pre-trained DRL model may be a neural network or an artificial neural network, and comprise at least one of a convolutional neural network (CNN) model, a deep neural network (DNN) (also known as a feedforward neural network or a multilayer perceptron) model and a recurrent neural network (RNN) model.

FIG. 1 shows an example embodiment of a pre-trained DRL model 100 comprising a pre-trained DNN model as a Q-approximator. In a variant embodiment, the pre-trained DRL model 100 may comprise, for example, at least a pre-trained CNN as a Q-approximator or a pre-trained RNN as a Q-approximator.

As can be seen, the input of the pre-trained DRL model 100 is the extracted feature vector v as an input beam feature and the output of the pre-trained DRL model 100 is an K-dimensional vector, where the k-th entry indicates the approximated Q value if the k-th beam $B_k$ is added into the GoB (as the next action), given the current state and action (s, a).

Moreover, the pre-trained DRL model 100 is characterized by a set of model parameters (e.g., weight matrices, bias vectors) and model hyperparameters (e.g., number of layers, number of neurons per layer, number of hidden layers/units/nodes, type of the activation function, learning rate, etc.), which may be stored in a data file, e.g., at a source agent (e.g., a cell site). Suppose L layers are defined for the pre-trained DRL model 100, a set of parameters and hyperparameters for the l-th layer may be denoted as $\theta^{(l)}$, t=1, . . . , L (e.g., including parameters such as weight matrix between l-th and (l−1)-th layer $\theta^{(l)}$, bias vector $b^{(l)}$, and including hyperparameters such as type of the layer $T^{(l)}$, number of the units of the layer $N_k^{(l)}$, filter size $S_f^{(l)}$, stride size $S_s^{(l)}$). Thus, transferring or reusing M layers of the pre-trained DRL model 100, where M≤L, comprises transferring or reusing a subset of the parameters and hyperparameters, denoted as $\{\theta^{(1)}, \ldots, \theta^{(m)}\}$, which characterizes these M layers.

As can be also seen, the pre-trained DRL model 100 may comprise a plurality of layers split into a first set of layers corresponding to initial layers (or low and medium layers) for those layers close to its input, and a second set of layers corresponding to last layers (or high layers) for those layers close to its output. Since a neural network model typically works by abstracting and transforming the information in steps, it may then be assumed that in the initial layers, the features extracted are generally more generic and independent of a particular agent than the features of the last layers, while the last layers, unlike the initial layers, need to be tuned specifically to the particular agent.

In the present disclosure, an agent may comprise a radio network agent and be defined as a network component (e.g., a cell site) that makes the decision of which action to take.

In an example first embodiment, two transfer learning scenarios may be proposed to accelerate the learning in a changing environment (scenario 1) and in another agent (scenario 2).

Figure 2:
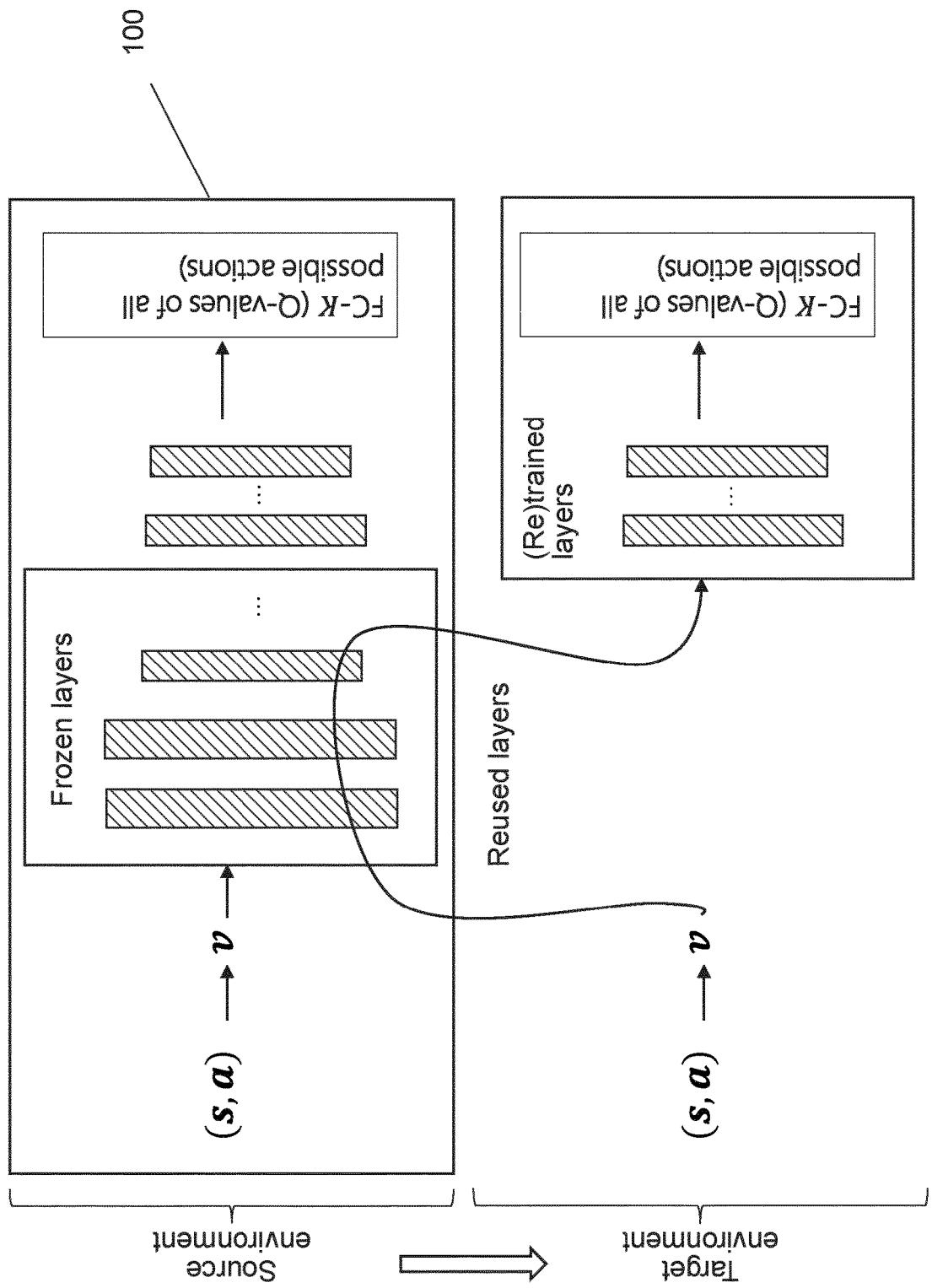
FIG. 2 shows an example embodiment of transfer learning from a source environment to a target environment within a similar source agent (scenario 1)

In the scenario 1, transfer learning may be performed from a source environment to a target environment within the same source agent, as shown in FIG. 2. This corresponds to the case where the pre-trained DRL model 100 is pre-trained at a source domain within a source agent (e.g., a cell site), and it needs to be adapted to a new environment, i.e., the target environment, at a target domain within the same source agent, as quickly as possible. Generally speaking, a domain may be defined as or consist of a feature space and a marginal distribution of the feature space.

As shown in FIG. 2, when the source environment has been changed into the target environment, transfer learning may comprise reusing, at the target domain, the first set of layers within the source agent, wherein the first set of layers may correspond to the depicted frozen layers, i.e., those layers that are not trainable as their respective weights cannot be modified; determining whether, for the target domain, to maintain the second set of layers from the source domain or modify the second set of layers from the source domain or replace the second set of layers from the source domain with a third set of layers; and in response to the determination, training or retraining, at the target domain, either the maintained second set of layers or the modified second set of layers or the third set of layers, those trained layers being depicted in FIG. 2 as retrained layers, using collected data from at least the target domain. It shall be noted that in the layers, these are the model hyperparameters that are to be maintained, modified or replaced, while these are the model parameters (in particular, the weights) that are to be trained or retrained.

Figure 3:
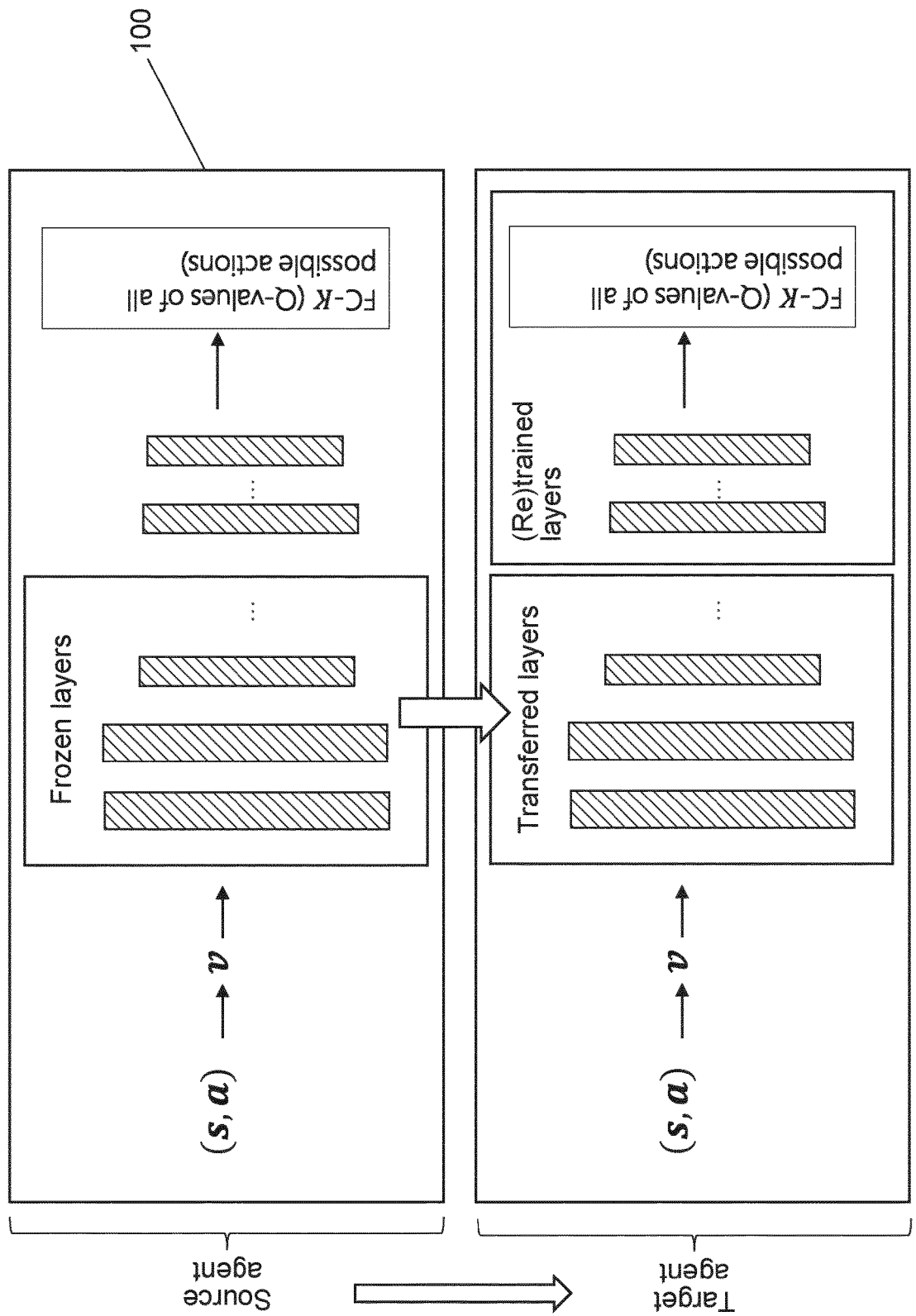
FIG. 3 shows an example embodiment of transfer learning from a source agent to a target agent within an environment being either similar or different (scenario 2)

In the scenario 2, transfer learning may be performed from a source agent to a target agent, within an environment being either similar or different, as shown in FIG. 3. This corresponds to the case where the pre-trained DRL model 100 is pre-trained at a source domain within a source agent (e.g., a cell site) within a source environment, and it needs to be adapted to another similar agent, i.e., the target agent, at a target domain within either the source environment or a target environment different from the source environment. In this scenario 2, the source and target agents may have the same GoB size, i.e., K'=K, or a different GoB size, i.e., K'≠K. Again, generally speaking, a domain may be defined as or consist of a feature space and a marginal distribution of the feature space.

As shown in FIG. 3, when a knowledge of the source agent is to be transferred to the target agent, transfer learning may comprise transferring a predetermined number of layers (i.e., a portion or an entirety of layers) amongst the first set of layers within the source agent at the source domain to the target agent at the target domain, wherein the first set of layers may correspond to the depicted frozen layers, i.e., those layers that are not trainable as their respective weights cannot be modified; determining whether, for the target domain, to maintain the second set of layers from the source domain or modify the second set of layers from the source domain or replace the second set of layers from the source domain with a third set of layers; and in response to the determination, training or retraining, at the target domain, either the maintained second set of layers or the modified second set of layers or the third set of layers, those trained layers being depicted in FIG. 3 as retrained layers, using collected data from at least the target domain. Again, it shall be noted that in the layers, these are the model hyperparameters that are to be maintained, modified or replaced, while these are the model parameters (e.g., the weights) that are to be trained or retrained.

In any of the above scenarios 1 and 2, maintaining the second set of layers from the source domain comprises reusing all layers of the second set of layers, and modifying the second set of layers from the source domain comprises modifying at least one layer of the second set of layers, and/or removing at least one layer of the second set of layers, and/or adding at least one layer to the second set of layers. Moreover, determining whether to maintain the second set of layers from the source domain, or modify the second set of layers from the source domain, or replace the second set of layers from the source domain, may comprise a heuristic determination, such as, e.g., a brute-force search, to help improve the GoB optimization performance. In particular, the heuristic determination helps find out how many layers to add or remove and how to modify the layers in the second set of layers. Furthermore, the data used to (re)train either the maintained second set of layers, or the modified second set of layers, or the third set of layers, may be target data collected from the target domain or a combination of both the target data collected from the target domain and a small subset of source data collected from the source domain. The subset of source data may be selected and added to the target data if there is not enough available training data in the target domain alone.

To decide the number of the predetermined number of layers amongst the first set of layers (i.e., amongst the initial layers or the low and medium layers) to be transferred from the source agent to the target agent within a similar or different environment, a similarity analysis between environment features at the source domain and at the target domain may be performed, e.g., at a central unit (CU) of a gNB. The motivation is that, the higher the similarity is, the more similar the DRL model 100 at the source domain and the DRL model at the target domain are, and thus the more layers can be transferred.

In the context of GoB optimization, the environment features may comprise at least one of temporal traffic distribution, spatial traffic distribution and antenna gains over space (i.e., received spatially dependent antenna gains from the beams).

As regards the spatial traffic distribution, various formats can be considered. One option is to divide the space to $N_x$, $N_y$, $N_z$ spatial intervals along latitude, longitude, and altitude, respectively, and count the percentage of traffic per grid of spatial area, such that the spatial traffic distribution is a matrix $P \in [0,1]^{N_x \times N_y \times N_z}$. Along similar lines, other options can be considered by dividing the cell area to $N_S$ several sub-regions (e.g., based on distance from the base station or/and azimuth and angle difference from the antenna direction), and compute the traffic density spread over the subregions. This leads to the traffic distribution as a vector $p \in [0,1]^{N_s}$.

As regards the antenna gains over space, they reflect the radio propagation condition for each beam.

As regards the temporal traffic distribution, the spatial-temporal traffic distribution can then be used, similar to the spatial traffic distribution, by adding one more dimension for time to the format of matrix $P \in [0,1]^{N_x \times N_y \times N_z}$ of the spatial traffic distribution, as to obtain the format of matrix $P' \in [0,1]^{N_x \times N_y \times N_z}$, where $N_T$ denotes the number of discrete time units (different time granularity may be considered such as, e.g., 15 minutes, one hour, even day, etc.), or by adding one or more dimension for time to the format of vector $p \in [0,1]^{N_s}$, where each element denotes the traffic density for a subregion, as to obtain the format of matrix $P \in [0,1]^{N_s \times N_T}$.

The similarity measure between two spatial traffic distributions may be defined as follows.

Let us take the example that the spatial traffic distribution is a matrix $P \in [0,1]^{N_x \times N_y \times N_z}$ where $N_x, N_y, N_z$ are the number of spatial intervals along latitude, longitude, and altitude, respectively. Thus, there are $N_x \times N_y \times N_z = N$ cuboids served by the cell site. It shall be noted that for the above scenario 2, the size of the cell site may still be normalized and the space served by the cell site may be divided with the same number of cuboids. The $(i_x, i_y, i_z)$-th entry $P[i_x, i_y, i_z] = p(x, y, z)$ corresponds to the predicted or approximated traffic density at location $(x, y, z)$. For the ease of further computation, the matrix can be flattened to the density vector $p \in [0,1]^N$. Given two three-dimensional spatial traffic distributions, P and Q, their distance can be computed using the distribution function distance measure such as the Kullback-Leibler (KL) divergence, i.e., $$D_{KL}(P\|Q) = -\sum_{i=1}^{N} p_i \log \frac{q_i}{p_i},$$

where $(p_1, \ldots, p_N)$ and $(q_1, \ldots, q_N)$ are the flattened density vector from distributions P and Q, respectively, $D_{KL}(P\|Q)$ reflecting how different the distribution Q is from P.

In case of a more general distribution, the similarity measure between two spatial-temporal traffic distributions may be defined as hereafter.

Along similar lines than for the spatial traffic distribution, there are $N_x \cdot N_y \cdot N_z \cdot N_T = N'$ cuboids over the 4 dimensional space (3d spatial+1d time), and the $(i_x, i_y, i_z, i_t)$-th entry $P[i_x, i_y, i_z, i_t] = p$ (x, y, z, t) corresponds to the predicted or approximated traffic density at position (x, y, z) and time unit t. The matrix can be flattened to density vector $p \in [0,1]^{N'}$, and the computation of distance measure $D_{KL}(P\|Q)$ is the same as in the case of spatial traffic distribution. In another case where the spatial area is divided into $N_s$ sub-regions instead of $N_x \cdot N_y \cdot N_z$ cuboids, the matrix $P \in [0,1]^{N_s \times N_T}$ can be flattened top $\in [0,1]^N$ where $N = N_s \cdot N_T$, and the same approach to compute distance measure $D_{KL}(P\|Q)$ can be used.

The similarity measure between two sets of spatially dependent antenna gains may be defined as follows.

The antenna gains over space for all beams is a matrix $G \in \mathbb{R}^{N_x \times N_y \times N_z \times K}$, where each entry $G[i_x, i_y, i_z] = G_k(x, y, z)$ is the antenna gain received from the k-th beam at location (x, y, z). For computational convenience, the matrix G may easily be converted into the matrix $\tilde{G} \in \mathbb{R}^{N \times K}$ by stacking the entries of the $N_x \times N_y \times N_z$ into one N-dimensional vector. And the distance measure between G and H can be represented by the distance measure between $\tilde{G}$ and $\tilde{H}$ i.e., $d_A(G, H) \equiv d_A(\tilde{G}, \tilde{H})$. Given two antenna gain-matrices $\tilde{G}$ and $\tilde{H}$ one of the matrix norms can be considered as a function $\|\|$: $\mathbb{R}^{N \times K} \to \mathbb{R}$ for example, the Frobenius norm $$\|\tilde{G} - \tilde{H}\|_F = \sqrt{\sum_{i=1}^{N}\sum_{k=1}^{K}\left(\tilde{g}_{i,k} - \tilde{h}_{i,k}\right)^2}.$$

The joint similarity measure for the traffic distribution-antenna gain matrix pair may be defined as hereafter.

Given the source environment $E_S(P, G)$ and the target environment $E_T(Q, H)$ characterized by the traffic distribution-antenna gain matrix pair (P, G) and (Q, H), respectively, the similarity $A(E_S, E_T)$ can be defined as a monotone decreasing function of the weighted sum of distance measures $d^{(traffic)}(P, Q)$ and $d^{(gain)}(G, H)$, by the following relationship:

$$A(E_S, E_T) = f(w^{(traffic)} d^{(traffic)}(P, Q) w^{(gain)} d^{(gain)}(G, H)) \quad (7)$$

where $f$ is monotone decreasing, $d^{(traffic)}(P, Q) = D_{KL}(P\|Q)$ and $$d^{(gain)}(G, H) = \|\tilde{G} - \tilde{H}\|_p.$$

Although that the above two distance measures $d^{(traffic)}(p,Q)$ and $d^{(gain)}(G,H)$ have different scales, given the min and max values based on the expert's knowledge or experience, these two distance measures can be normalized prior to computing the weighted sum.

To finally decide the number of the predetermined number of layers amongst the first set of layers (i.e., amongst the initial layers or the low and medium layers) to be transferred from the source agent to the target agent within a similar or different environment, a monotone non-decreasing function $\phi: \mathbb{R}\{1, \ldots, L\}$ that maps the similarity measure to the number of layers, e.g., a step function, may be designed in an example embodiment. In an alternative example embodiment, the similarity measure may be discretized and a look-up table to map the output (number of layers) with the input (similarity level) may then be provided.

It shall be noted that, owing to transfer learning, the adaptation of the pre-trained DRL model 100 can be performed more frequently as the training time of the adapted pre-trained DRL model can significantly decrease. In an example embodiment, the adaptation may comprise, for example, a periodic adaptation (e.g., every 15 minutes), a reactive adaptation (e.g., when observing change point of traffic pattern or network environment state), a proactive adaptation (e.g., by anticipating the change of the traffic profile or network environment state and performing the adaptation based on the predicted network behavior), and so on.

Figure 4:
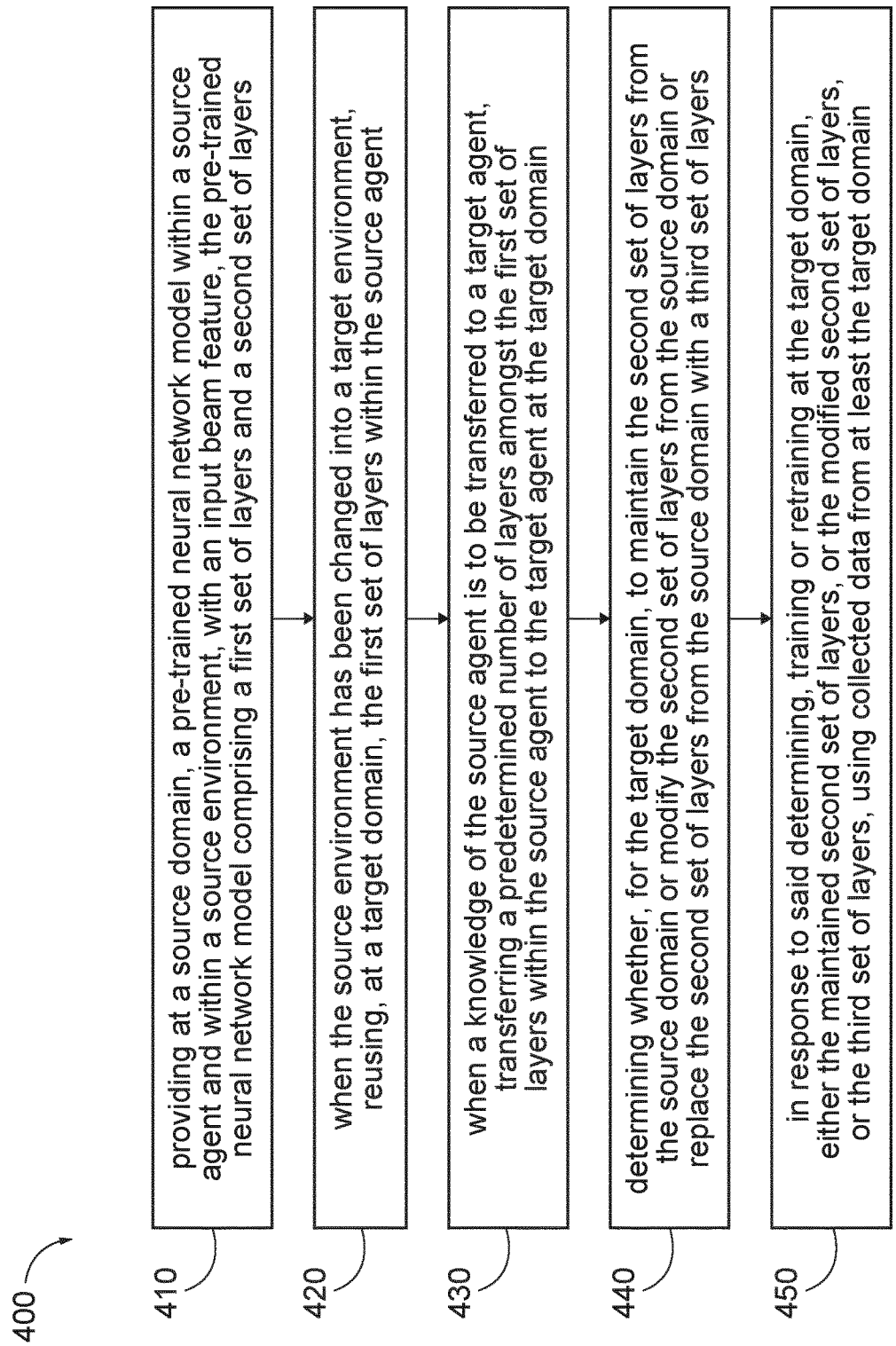
FIG. 4 shows an example flowchart describing an example embodiment of a transfer learning method for exploiting a knowledge of a pre-trained neural network model from a source environment to a target environment within a similar source agent and from a source agent to a target agent within an environment being either similar or different.

FIG. 4 shows an example flowchart 400 describing an example embodiment of a transfer learning method for exploiting a knowledge of the pre-trained neural network, as the pre-trained DRL model 100 of FIG. 1, from a source environment to a target environment within a similar source agent and from a source agent to a target agent within an environment being either similar or different.

This example flowchart 400 comprises the following steps:

in step 410, the transfer learning method may comprise providing at a source domain, a pre-trained neural network model within a source agent and within a source environment, with an input beam feature, the pre-trained neural network model comprising a first set of layers and a second set of layers;

in step 420, when the source environment has been changed into a target environment, the transfer learning method may comprise reusing, at a target domain, the first set of layers within the source agent;

in step 430, when a knowledge of the source agent is to be transferred to a target agent, the transfer learning method may comprise transferring a predetermined number of layers amongst the first set of layers within the source agent to the target agent at the target domain;

in step 440, the transfer learning method may comprise determining whether, for the target domain, to maintain the second set of layers from the source domain or modify the second set of layers from the source domain or replace the second set of layers from the source domain with a third set of layers; and in step 450, in response to said determining, the transfer learning method may comprise training or retraining at the target domain, either the maintained second set of layers, or the modified second set of layers, or the third set of layers, using collected data from at least the target domain.

Figure 5:
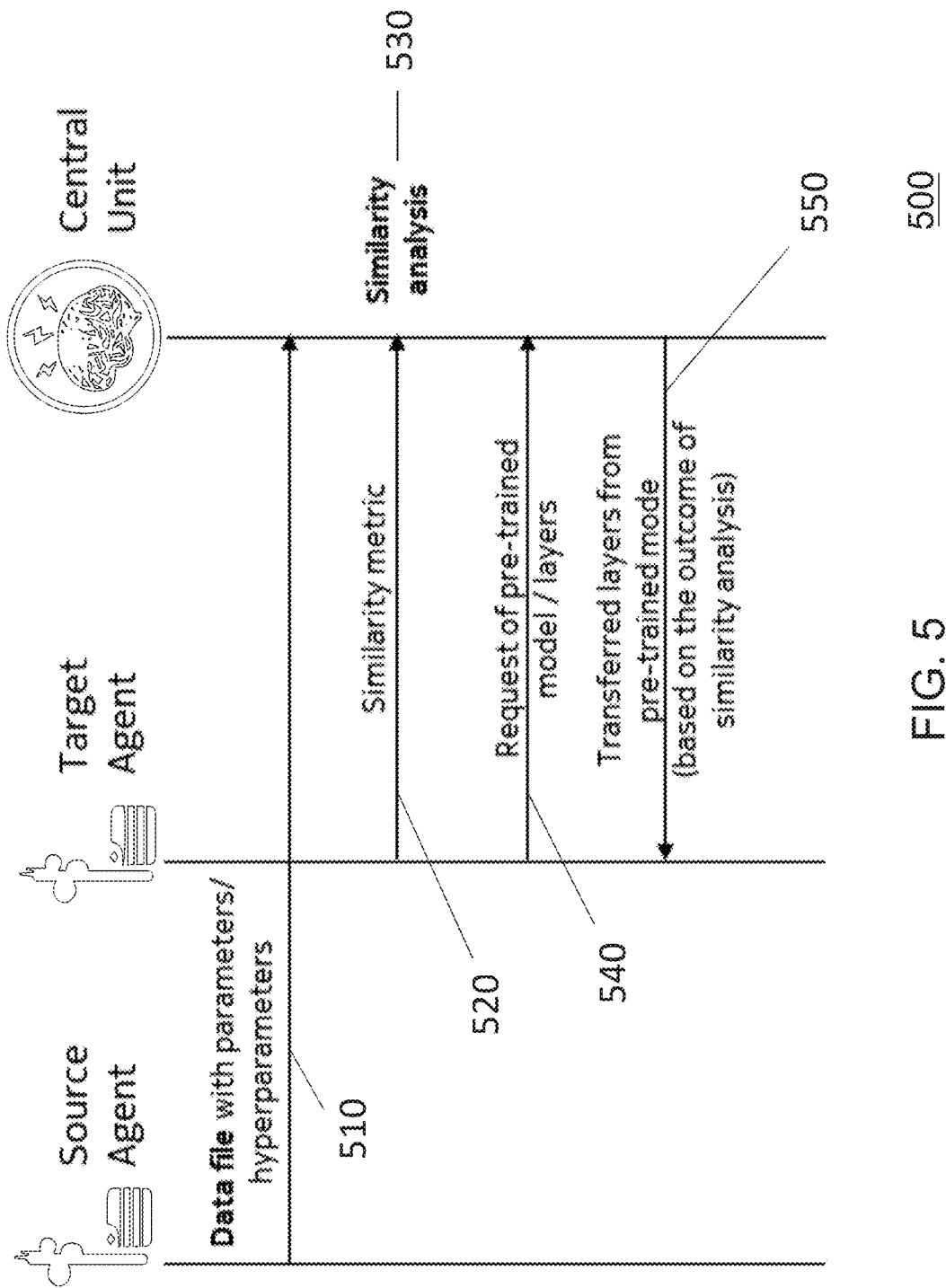
FIG. 5 shows an example flowchart describing an example information exchange for transfer learning from a source agent to a target agent.

FIG. 5 shows an example flowchart 500 describing an example information exchange for transfer learning from a source agent to a target agent, wherein a pre-trained neural network model is provided at a source domain within a source agent, and wherein, for each layer of the pre-trained neural network model, a set of model parameters and model hyperparameters characterizing the pre-trained neural network model is stored in a data file at the source agent (e.g., a cell site).

This example flowchart 500 comprises the following steps:

in step 510, the parameters and hyperparameters stored in the data file are transferred to a central unit (CU), e.g., a CU of a gNB;

in step 520, the target agent sends similarity metrics to the CU;

in step 530, the CU performs a similarity analysis on the transferred parameters and hyperparameters, based on the similarity metrics;

in step 540, the target agent sends a request of layers of the pre-trained neural network model to the CU;

in step 550, the CU transfers, in response, a predetermined number of layers to the target agent based on the outcome of the similarity analysis, the predetermined number of layers being proportional to an increasing similarity.

Figure 6:
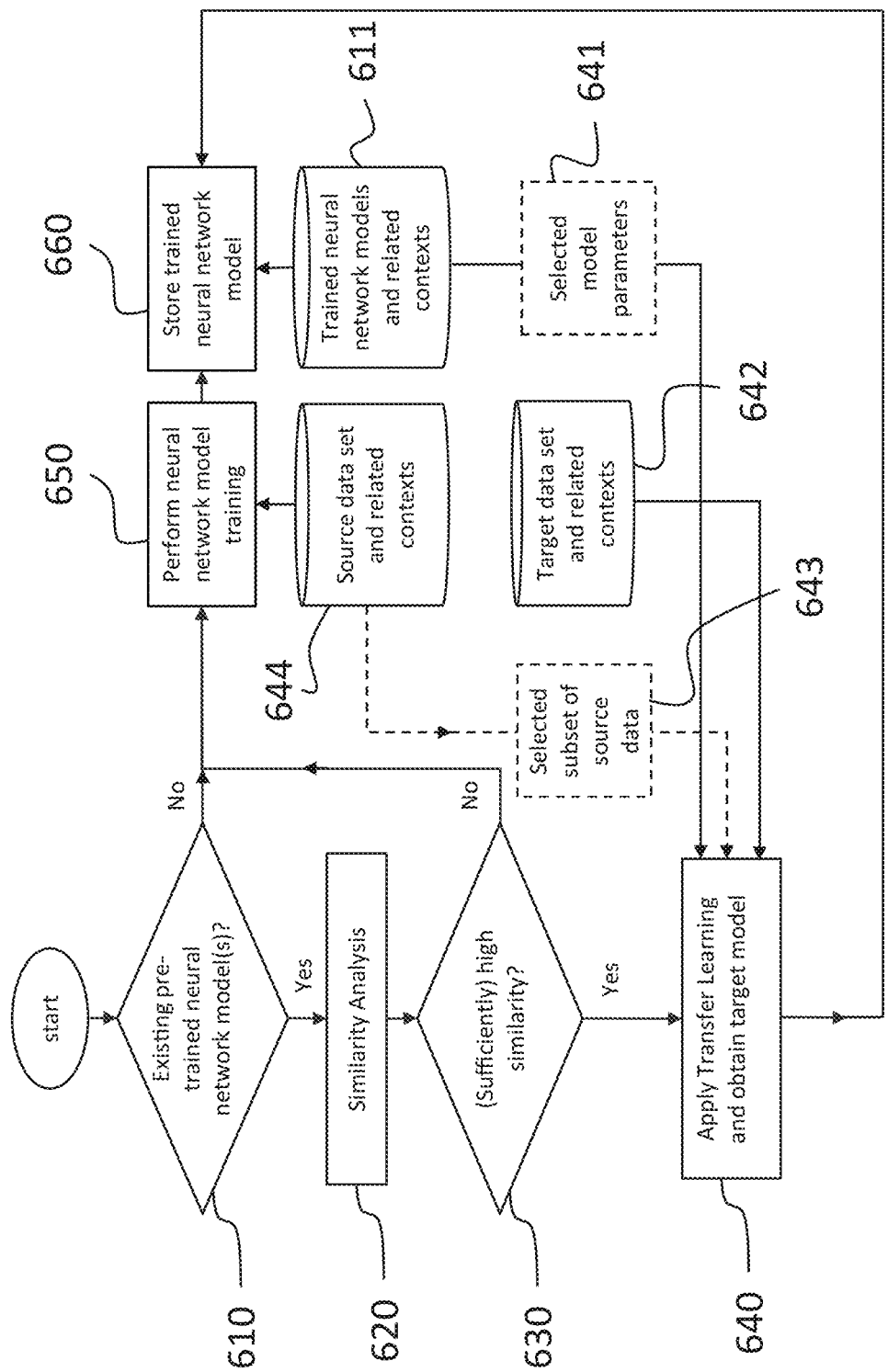
FIG. 6 shows an example flowchart 600 describing an example embodiment of transfer learning for any of scenarios 1 and 2.

FIG. 6 shows an example flowchart 600 describing an example embodiment of transfer learning for any of scenarios 1 and 2.

This example flowchart 600 comprises the following steps:

in step 610, it is determined whether a pre-trained neural network model related to a specific context exists in a dedicated database 611 storing (pre-) trained neural network models and their related context. If it exists, then go to step 620, else go to step 650;

in step 620, when it is determined that the pre-trained neural network model exists in the database 611, a similarity analysis of the layers (i.e., a similarity analysis of the parameters and hyperparameters characterizing these layers) of the pre-trained neural network model between environment features at the source domain and at the target domain is performed;

in step 630, it is determined whether the similarity is high or low with respect to a predefined threshold level. If it is high, then go to step 640, else go to step 650;

in step 640, when it is determined that the similarity is high, transfer learning from the source domain to the target domain may be applied as to obtain the target model, by transferring selected model parameters 641 of layers of the pre-trained neural network model from the database 611, and by training the target model using either a target data set and their related context 642 or the target data set and their related context 642 together with a small selected data subset 643 of a source data set and their related context 644. Whether to add the small selected data subset 643 of the source data set and their related context 644 may depend on the amount of available (target) data in the target domain;

in step 650, when it is determined that a neural network model being trained does not exist or that the similarity is low, a training of the neural network model is performed using the source data set and their related context 653644, as to obtain a newly trained neural network model;

in step 660, the trained target model and/or the newly trained neural network model are stored in the dedicated database 611 of trained neural network models and their related context.

in step 650, when it is determined that a neural network model being trained does not exist or that the similarity is low, a training of the neural network model is performed using the source data set and their related context 653, as to obtain a newly trained neural network model;

in step 660, the trained target model and/or the newly trained neural network model are stored in the dedicated database 611 of trained neural network models and their related context.

In an example second embodiment, transfer learning will be performed between a global (in terms of larger feature/state space including the environment features in addition to the beam feature) teacher model with a generalist knowledge, and a smaller (in terms of number of layers) and faster student model, based on a knowledge distilling mechanism.

Figure 7:
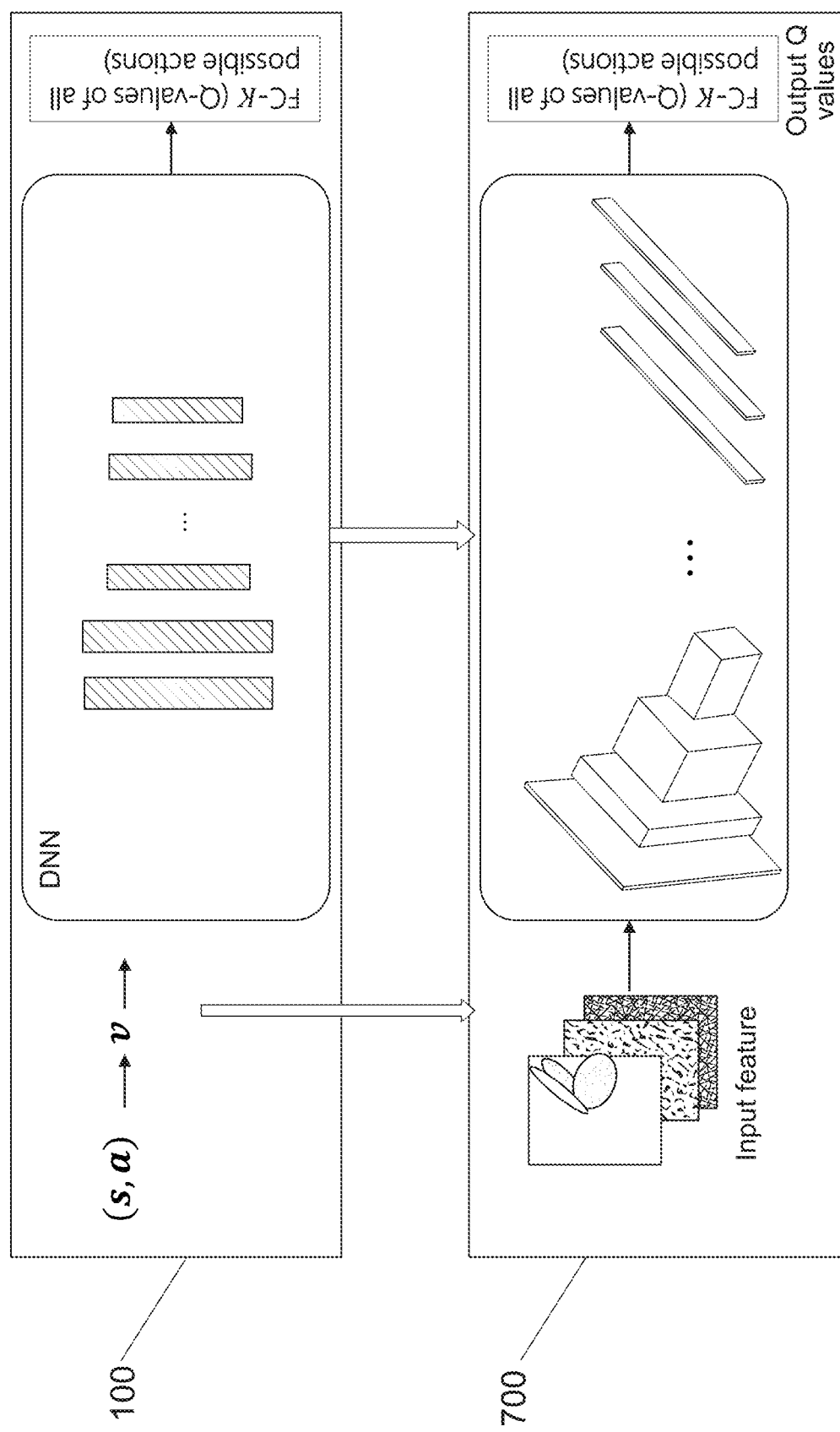
FIG. 7 shows an example embodiment of a structural modification of the pre-trained DRL model into a teacher model.

FIG. 7 shows an example embodiment of a structural modification of the pre-trained DRL model 100 of FIG. 1 into a teacher model 700.

Compared to the pre-trained DRL model 100 of FIG. 1 that has a single format of input beam feature, i.e., the feature vector v, more input features reflecting the network environment states need to be introduced in the global teacher model 700 by including new input environment features transformed into various formats. Therefore, depending on respective data formats of the input beam and environment features, the pre-trained DRL model 100 of FIG. 1 needs to be redesigned to combine these input features.

As can be seen, the input beam feature as input of the pre-trained DRL model 100 at a source domain is converted from a vector format to an image/matrix format and input environment features in the same format of image/matrix are provided as additional input features of the pre-trained DRL model 100. Based on the new format (i.e., image/matrix format instead of vector format) of the input features, the pre-trained DRL model 100 is then structurally modified as to obtain, at the source domain, the teacher model 700 including the convolutional neural networks.

The potential features to be included as input to the pre-trained DRL model may comprise at least:

traffic spatial distribution as a matrix $P \in [0,1]^{N_x \times N_y \times N_z}$ where $N_x$, $N_y$, $N_z$ are the number of spatial intervals along latitude, longitude, and altitude, respectively, as above-mentioned;

traffic spatial-temporal distribution as a matrix $P' \in [0,1]^{N_x \times N_y \times N_z \times N_T}$ where $N_x$, $N_y$, $N_Z$ are the number of spatial intervals along latitude, longitude, and altitude, respectively, and $N_T$ denotes the number of discrete time units, as above-mentioned;

received beamforming gain over space as a matrix $G \in \mathbb{R}^{N_x \times N_y \times N_z \times K}$ where K is the number of beams in the dictionary of the beams, each entry $G[i_x, i_y, i_z, i_k] = G_k(x, y, z)$ is the received beamforming gain received from the k-th beam at location (x, y, z), as above-mentioned; and extracted beam features, which may be converted to the following formats:

vector $v \in \mathbb{R}$, as shown in FIG. 1; and images/matrices: the shapes and the directions of the original beams may be converted to images/matrices $\tilde{B} \in \mathbb{R}^{N'_x \times N'_y \times N'_z}$ where $\tilde{B}$ is the aggregated beam array over the selected number of beams, and $N'_x$, $N'_y$, $N'_z$, may have either similar or different values from $N_x, N_y, N_z$, respectively. Different values of $N'_x$, $N'_y$, $N'_z$ from $N_x, N_y, N_z$, can be considered because the beam pattern concentrates more in some region, while almost approaches zero in other regions. To reduce the dimension of the input feature/state, the size of the beam images can be reduced, e.g., by cropping the edges or using quantizer with larger quantization intervals.

Then, the structurally modified pre-trained DRL model 100 as the teacher model 700 may be trained, as to obtain a trained teacher model 700, using the input beam and environment features in their respective formats from the source domain.

Figure 8:
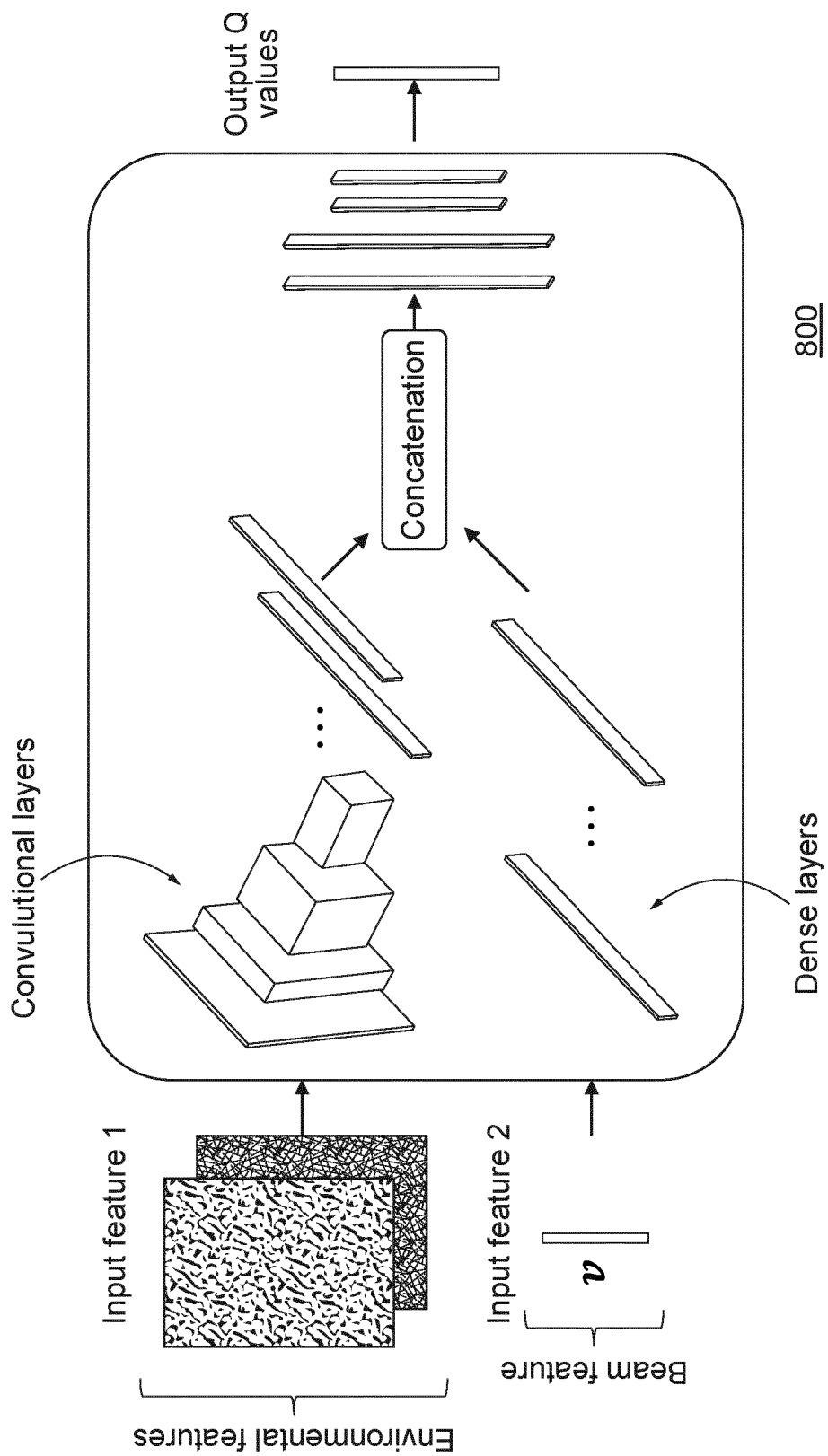
FIG. 8 shows an example embodiment of an architecture of the teacher model being trained using the input environment features in the image/matrix format and the input beam feature in the vector format.

FIG. 8 shows an example embodiment of an architecture 800 of the teacher model being trained using the input environment features in the image/matrix format and the input beam feature in the vector format.

As shown, the environment features comprise the traffic spatial distribution as a matrix P and the antenna gain over space as the matrix G, and the matrices P and G are stacked together as $N_z \cdot (K+1)$ slices of $N_x \times N_y$ pixel images, such that the teacher model is inputted by the extracted beam feature as a vector v (depicted as input feature 2) and by the environment features as images/matrices (P, G) (depicted as input feature 1). The images/matrices (P, G) on one hand and the vector v on the other hand are respectively used as two separate inputs, and respectively followed by convolutional layers and dense layers. Then, the features extracted from the image/matrix convolutional layers and the features extracted from the vector dense layers are concatenated. After the concatenation, some more dense layers may be introduced/added into the teacher model, before the final output layer.

Figure 9:
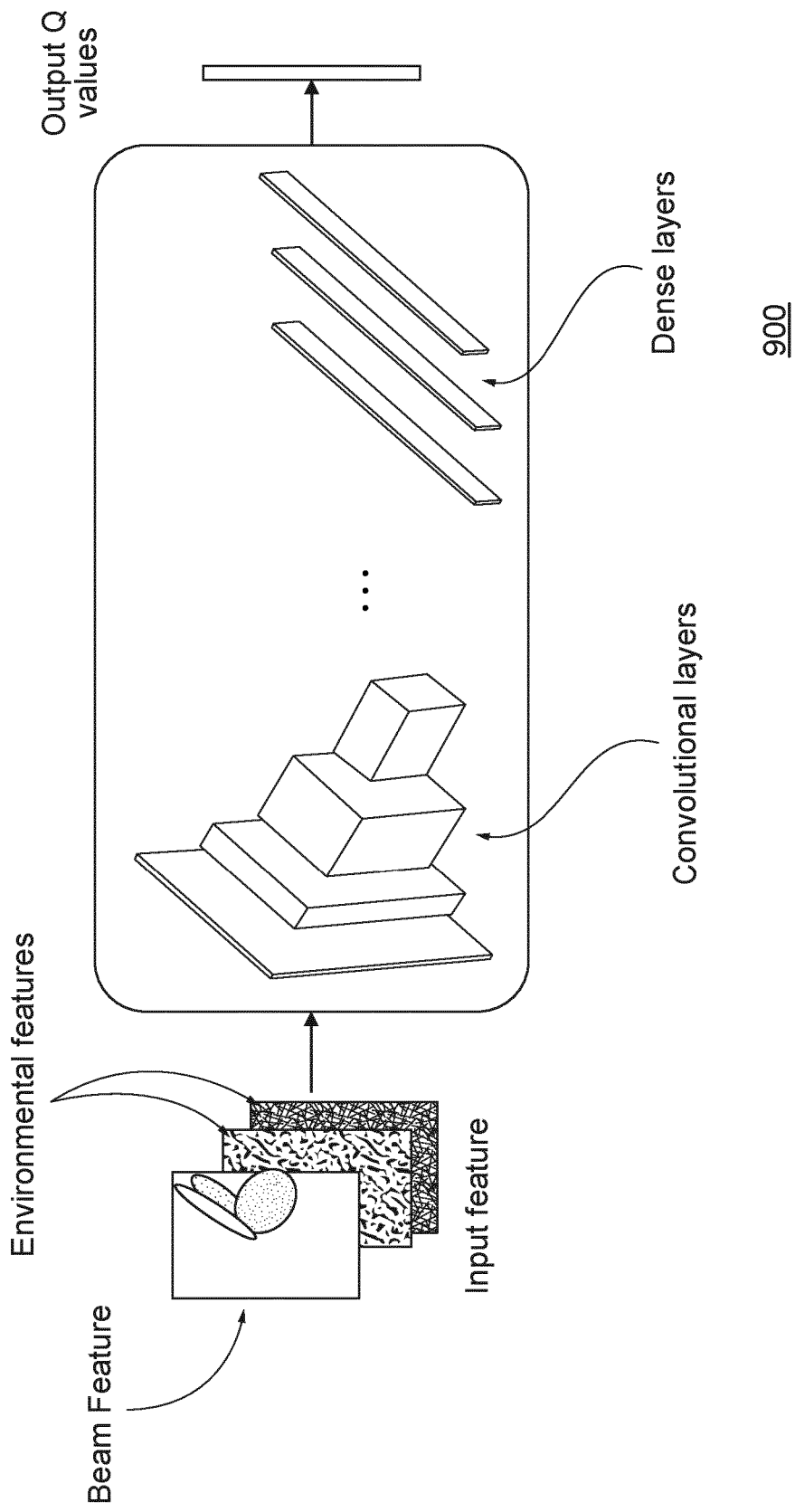
FIG. 9 shows an example embodiment of an architecture of the teacher model being trained using the input environment features and the input beam feature being each in the same format of image/matrix with the same respective size.

FIG. 9 shows an example embodiment of an architecture 900 of the teacher model being trained using the input environment features and the input beam feature being each in the same format of image/matrix with the same respective size.

As shown, the environment features and the beam feature are each in the same format of an image/matrix with the same x, y dimensions $N_x$ and $N_y$. Thereby, all these images/matrices can be stacked together, such that the teacher model is inputted by the beam and environment features as images/matrices. These images/matrices are used as a single input, and followed by convolutional layers. Some more dense layers may be introduced/added into the teacher model after the convolutional layers and before the final output layer.

Figure 10:
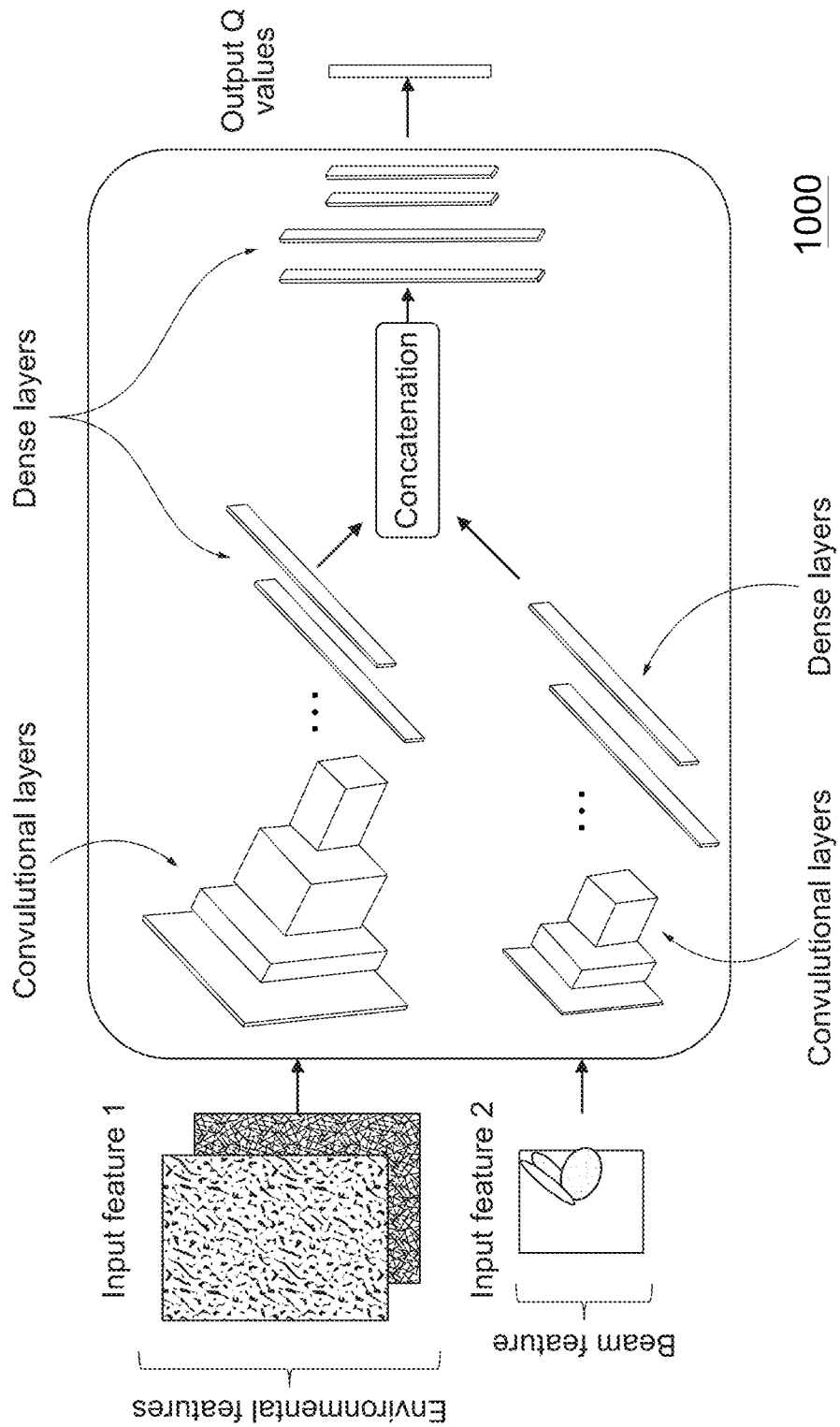
FIG. 10 shows an example embodiment of an architecture of the teacher model being trained using the input environment features and the input beam feature being in the same format of image/matrix with various sizes.

FIG. 10 shows an example embodiment of an architecture 1000 of the teacher model being trained using the input environment features and the input beam feature being in the same format of image/matrix with various sizes.

As shown, the environment features and the beam feature are in the same format of an image/matrix but the environment features and the beam feature have different x, y dimensions $N'_x \neq N_x$ and $N'_y \neq N_y$, for each feature type (i.e., for the type environment and for the type beam). In the example embodiment, the dimensions $(N_x, N_y)$ of the beam feature are smaller than those $(N'_x, N'_y)$ of the environment features. The size of the beam image has been reduced until being smaller than the environment images (i.e., the traffic spatial distribution and antenna gain over space images), e.g., by cropping the edges or using quantizer with larger quantization intervals. The environment images/matrices with the same x, y dimensions $N'_x$ and $N'_y$, can be stacked together, such that the teacher model is inputted by the environment features as images/matrices. On the other hand, the teacher model is additionally inputted by the beam image/matrix with different x, y dimensions $N_x$ and $N_y$. Thereby, the two types (i.e., the beam type and the environment type) of images/matrices are used as two separate inputs, and each followed by convolutional layers. Some more dense layers may be introduced/added into the teacher model after the convolutional layers and before the final output layer.

Figure 11:
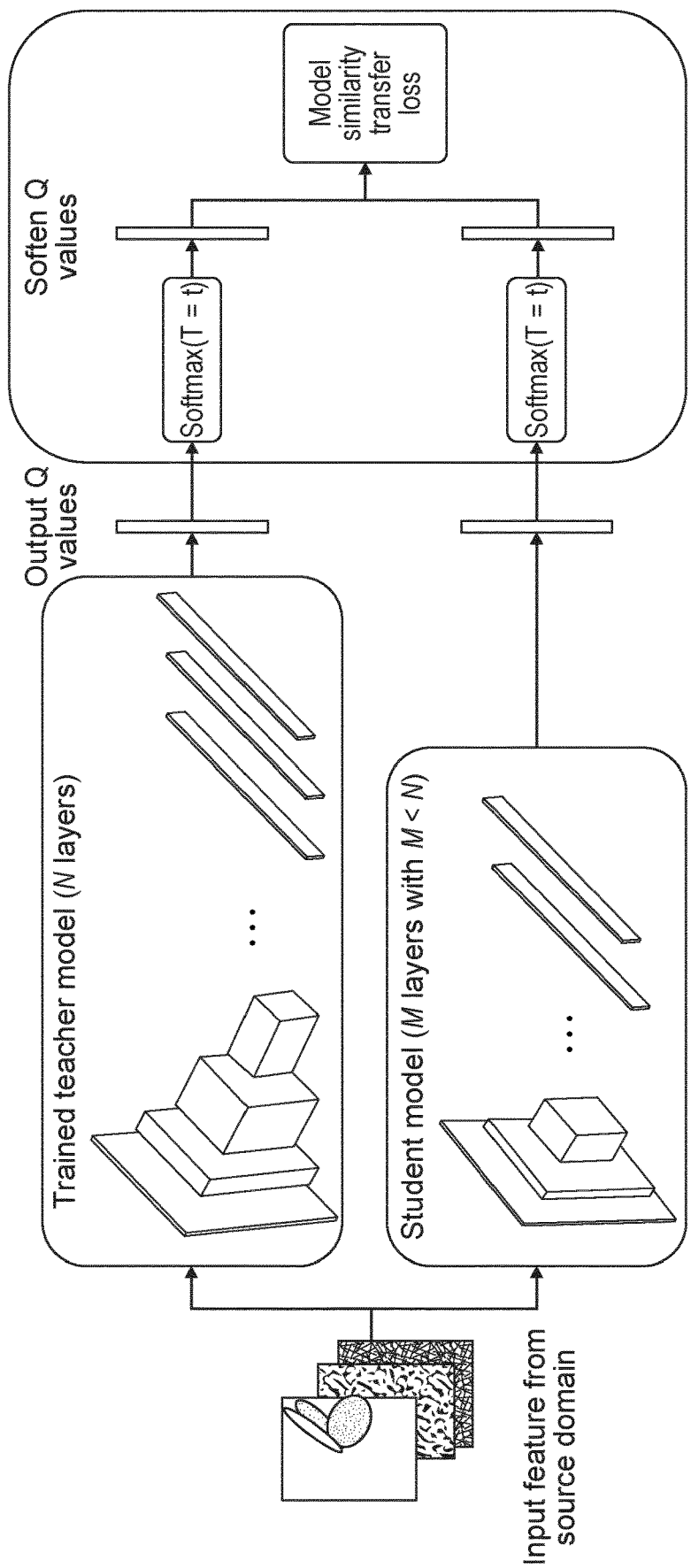
FIG. 11 shows an example embodiment of a student model being trained using the input beam and environment features and the output of the trained teacher model.

FIG. 11 shows an example embodiment of a student model being trained using the input beam and environment features and the output of the trained teacher model.

The student model to which the generalist knowledge may be transferred from the trained teacher model, may be constructed as a smaller (in terms of number of layers) pre-trained DRL model or even as a smaller teacher model (i.e., a structurally modified pre-trained DRL model). As depicted in FIG. 11, the trained teacher model comprises N layers, whereas the student model comprises M layers with M<N, where M may be determined by heuristics, such as, e.g., a brute-force search. For example, a set of possible values of M can be predefined and the student model can be trained, as depicted in FIG. 11, for each of the values of M, and the value of M that achieves the lowest minimum model similarity transfer loss can then be selected.

As shown, the student model may be trained using the input beam and environment features from the source domain, identically to the training of the teacher model, and also the output of the trained teacher model, to mimic the output of the trained teacher model. It shall be noted that none of the ground-truth outputs is used for training because to approximate the behavior of the teacher model, only the output generated by the teacher model is needed.

To mimic the output of the trained teacher model may comprise minimizing at least one loss function between the output of the trained teacher model and the output of the student model, such that the student model can mimic the behavior of the trained teacher model by providing output values $q^s$ that are similar or closest to the output values $q^t$ of the trained teacher model.

In this regard, various loss functions, taken singly or in combination, may be considered such as, but not limited to, the model similarity transfer loss (e.g., based on MSE) and the Kullback-Leibler (KL) divergence with temperature as further found in Hinton G. et al., "Distilling the Knowledge in a Neural Network", arXiv:1503.02531v1, 9 Mar. 2015. Other loss functions based on, for example, MSE and/or KL divergence with temperature may be considered by adding to their respective loss $L_{MSE}^{(sim)}$ and $L_{KL}^{(sim)}$, a weighted regularization term such as the L1 regularization term $$\lambda \sum_{i=1}^{L} |w_i|$$

or the L2 regularization term $$\lambda \sum_{i=1}^{L} \|w_i\|_2^2,$$

where $w_i$ is the weight vector for the ith layer of the neural network loss.

The model similarity transfer loss may comprise, for example, a direct distance function mean-squared-error (MSE) loss $L_{MSE}^{(sim)}$ of the model outputs expressed by the following relationship:

$$L_{MSE}^{(sim)} = \frac{1}{K} \sum_{k=1}^{K} (q_k^s - q_k^t)^2 \qquad (8)$$

where $q^s \in \mathbb{R}^K$ and $q^t \in \mathbb{R}^K$ are the output Q values of the student and the teacher models, respectively.

Although the outputs are not distribution but rather the expected future discounted reward of each possible action, the KL divergence with temperature r may be used as an alternative model similarity transfer loss and be given by the following relationship:

$$L_{KL}^{(sim)} = \sum_{k=1}^{K} softmax\left(\frac{q^t}{\tau}\right) \ln \frac{softmax\left(\frac{q^t}{\tau}\right)}{softmax\left(\frac{q^s}{\tau}\right)} \qquad (9)$$

where $\tau$ is the temperature (T) for the softmax function.

As shown, the example embodiment of FIG. 11 jointly uses the KL divergence and the model similarity transfer loss (e.g., $L_{MSE}^{(sim)}$) to mimic the output of the trained teacher model. Each of the output values of the student model ($q^s$) and the trained teacher model ($q^t$) passes through a relaxed (high temperature) softmax function (depicted as Softmax(T=t)) to be softened so that more knowledge can be transferred from the trained teacher model to the student model, and the resulting softened Q values are then used to minimize the model similarity transfer loss (e.g., $L_{MSE}^{(sim)}$).

Figure 12:
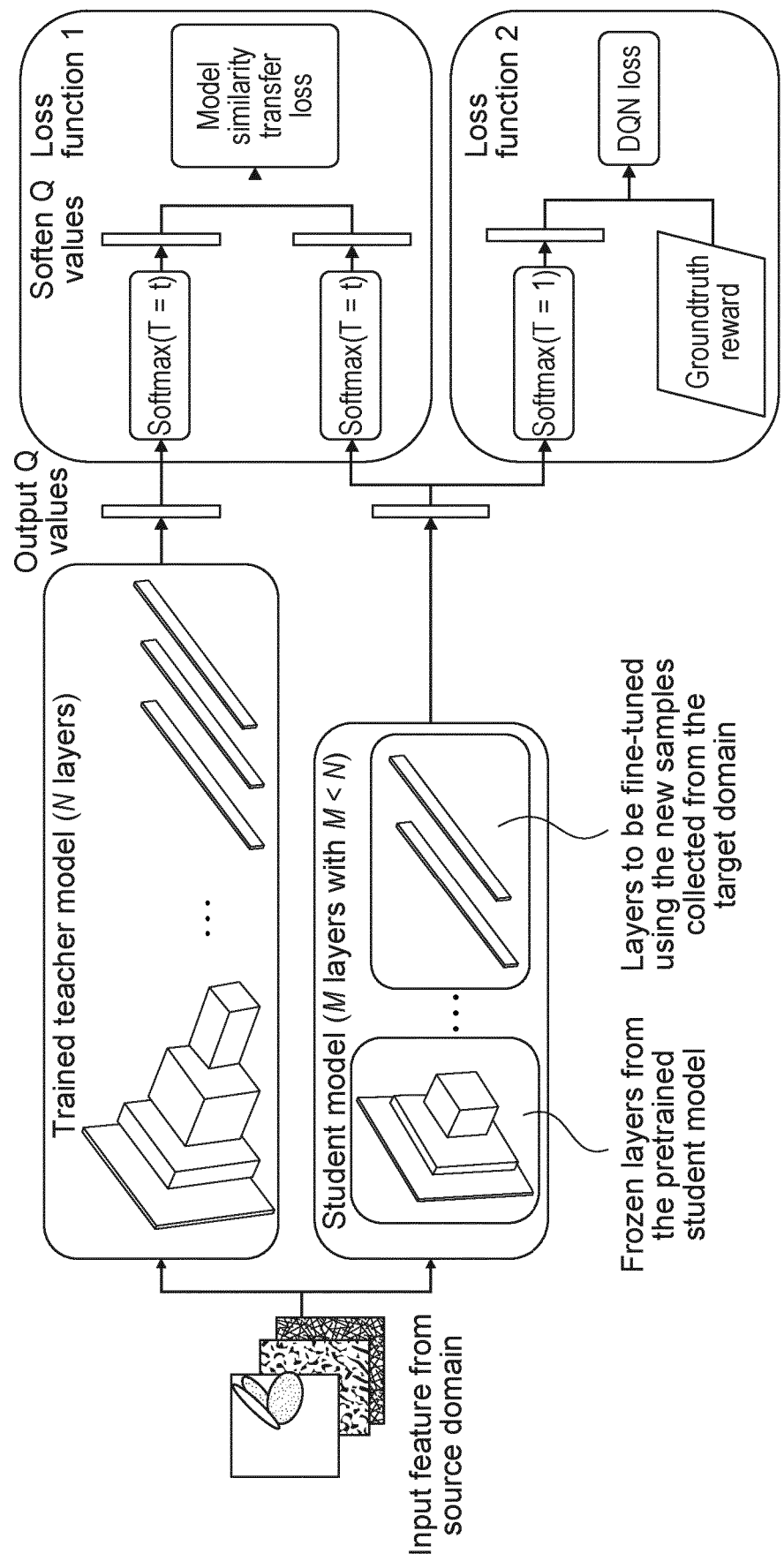
FIG. 12 shows an example embodiment of a trained student model being fine-tuned.

After the above training phase, the trained student model may be fine-tuned, as shown in FIG. 12.

In the example embodiment of FIG. 12, the trained student model may be fine-tuned by training a selected number of last layers (i.e., by training their respective weights) of the trained student model using the collected data (e.g., the input beam and environment features) from the target domain, by softening each of the output values of the trained student model ($q^s$) and the trained teacher model ($q^t$), and by jointly minimizing the model similarity transfer loss $L_{MSE}^{(sim)}$ (depicted as Loss function 1) and the standard deep Q-network (DQN) approximation loss $L^{(Q)}$ (depicted as Loss function 2) for each parameter update iteration i, where $L^{(Q)}$ is given by the following relationship:

$$L^{(Q)} = \mathbb{E}_{(s,a) \sim \Omega(\cdot); s' \sim \mathcal{E}} \left[ r + \gamma \max_{a'} Q(s', a'; \theta_{i-1}) - Q(s, a; \theta_i) \right] \quad (10)$$

From $L^{(Q)}$, it can be observed that an older version of the parameters $\theta_{i-1}$ is used to stabilize the learning.

As can be seen, the model similarity transfer loss $L_{MSE}^{(sim)}$ uses the resulting softened Q values of the trained teacher and student models, while the standard deep Q-network (DQN) approximation loss $L^{(Q)}$ uses the resulting softened Q values of the trained student model and the ground-truth reward output.

For the trained student model, the number of last layers to be trained may be selected using the same similarity analysis as described in the example first embodiment, between the source domain and the target domain.

It shall be noted that both teacher and student models are trained using data collected from the source domain, whereas the thus-obtained trained student model is fine-tuned by training a selected number of last layers using a limited amount of data, i.e., data collected only from the target domain. A major advantage may be that the student model may be much smaller than the teacher model such that, not only the optimization and prediction speed is drastically increased, but also the storage cost for the student model may be reduced, which may be attractive for the low storage and low computation capacity edge units.

In an example embodiment, the pre-trained DRL model 100 used in the example first and second embodiments may have been previously trained using synthetic or simulated data from the network simulator instead of or in addition to collected data from real measurements, in case of lacking real measurements for collecting data.

Then, the pre-trained DRL model 100 at the source domain may be adapted, via respective transfer learning, to the target domain using real measurements from the target domain to (re)train, at the target domain, a selected number of layers of the target model.

Figure 13:
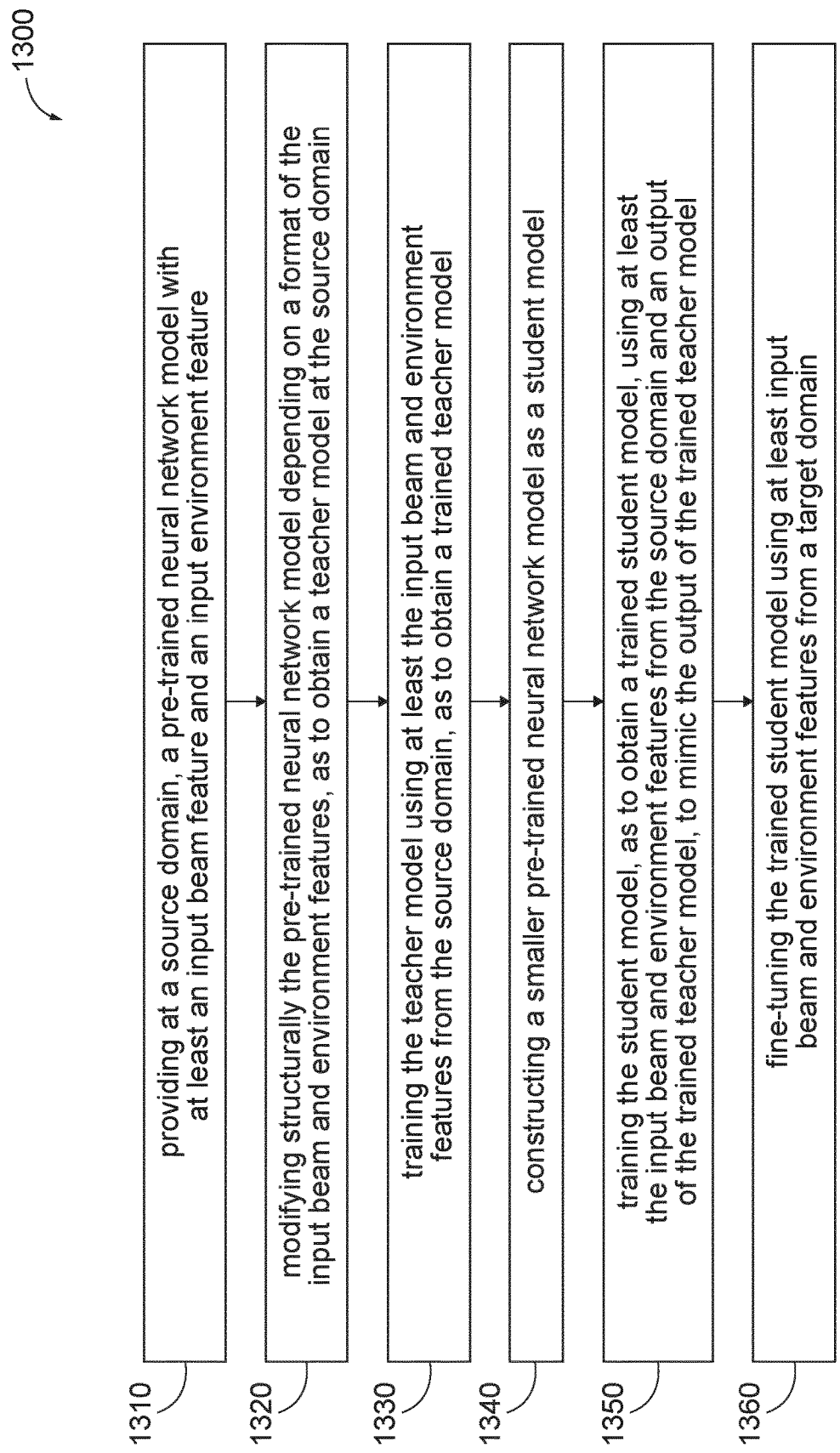
FIG. 13 shows an example flowchart describing an example embodiment of a transfer learning method for exploiting a knowledge of a trained teacher model by a student model.

FIG. 13 shows an example flowchart 1300 describing an example embodiment of a transfer learning method for exploiting a knowledge of a trained teacher model, which is derived from the pre-trained neural network model of FIG. 1, by a student model.

This example flowchart 1300 comprises the following steps:
  in step 1310, the transfer learning method may comprise providing at a source domain, a pre-trained neural network model with at least an input beam feature and an input environment feature;
  in step 1320, the transfer learning method may comprise modifying structurally the pre-trained neural network model depending on a format of the input beam and environment features, as to obtain a teacher model at the source domain;
  in step 1330, the transfer learning method may comprise training the teacher model using at least the input beam and environment features from the source domain, as to obtain a trained teacher model;
  in step 1340, the transfer learning method may comprise constructing a smaller pre-trained neural network model as a student model;
  in step 1350, the transfer learning method may comprise training the student model, as to obtain a trained student model, using at least the input beam and environment features from the source domain and an output of the trained teacher model, to mimic the output of the trained teacher model; and
  in step 1360, the transfer learning method may comprise fine-tuning the trained student model using at least input beam and environment features from a target domain.

Figure 14:
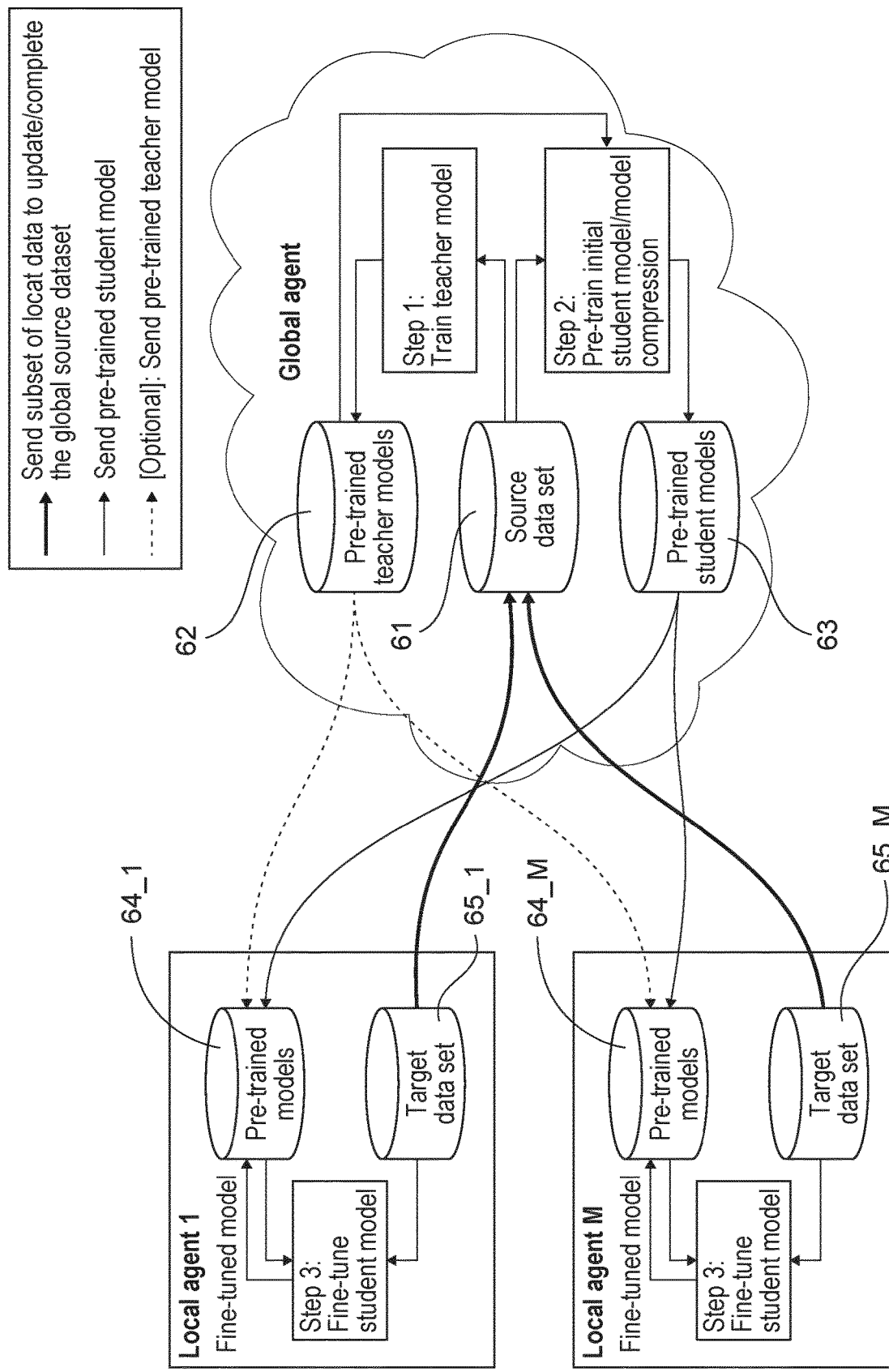
FIG. 14 shows an example embodiment of a teacher-student framework for transfer learning within a global agent and within a distribution of local agents.

FIG. 14 shows an example embodiment of a teacher-student framework for transfer learning within a global agent and within a distribution of local agents.

As shown, a teacher model within a "global" agent may be used to derive multiple student models to be then distributed to different "local" agents, which may significantly improve the sample efficiency for training.

In step 1, within the global agent, a teacher model is trained using a source data set 61, as to obtain a pre-trained teacher model, prior to being stored in a database 62 of pre-trained teacher models;

In step 2, within the global agent, a student model as a smaller pre-trained teacher model is constructed and then trained using the source data set 61, as to obtain a pre-trained student model, prior to being stored in a database 63 of pre-trained student models. The pre-trained student model and optionally the pre-trained teacher model may then be sent to a plurality of local agents 1 to M to be received at a respective database 64 (64_1 to 64_M) of pre-trained models.

In step 3, each local agent retrieves the pre-trained student model from their database 64 in order to fine-tune the pre-trained student model using a respective target data set 65 (65_1 to 65_M). The fine-tuned pre-trained student model is then stored in the respective database 64. A subset of the target data set 65 of each local agent 1 to M may also be sent to the global agent for updating and/or completing the source data set 61 of the global agent.

Figure 15:
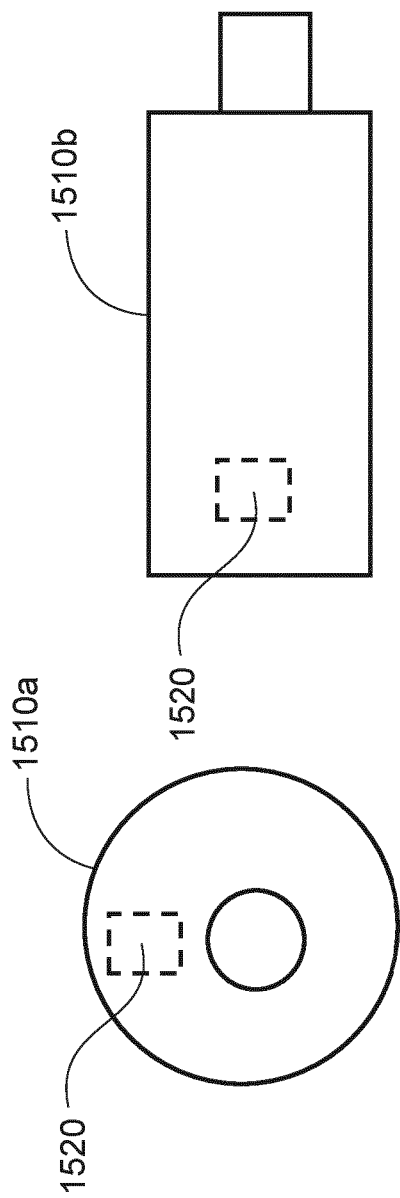
FIG. 15 shows an example embodiment of non-transitory computer readable media.

FIG. 15 shows an example embodiment of non-transitory computer readable media 1510a (e.g., a computer disc (CD) or a digital versatile disc (DVD)) and 1510b (e.g., a universal serial bus (USB) memory stick), which are configured to store instructions and/or parameters 1520 that, when executed by a processor, allow the processor to perform one or more of the steps of any of the methods of any of the disclosed embodiments.

The disclosed transfer learning-based solution has the benefit of:
- exploiting an extracted knowledge learned from the source domain via the source agent and/or environment and adapts the extracted knowledge to the target domain via the target agent and/or environment.
- leading to a fast learning process under unknown dynamics because the adaptation of the extracted knowledge to the target domain via the target agent and/or environment is performed by partially retraining or fine-tuning a selection of layers of the pre-trained DRL model 100.
- reducing data cost related to data storage, data transfer and data collection. For example, instead of transferring raw data for training, the knowledge is transferred to the target agent by transferring a partial (or complete) set of parameters and hyperparameters. This reduces the cost for local data storage and data transfer between the agents. Moreover, since the approach enables quick learning with limited training data/samples collected from the target domain, this also reduces the cost for test trail and data collection.

It should be appreciated that, while the above has described some example embodiments, there are several variations and modifications which may be made to the disclosed solution without departing from the scope of the present application while being within the scope of the attached claims.

In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Figure 16:
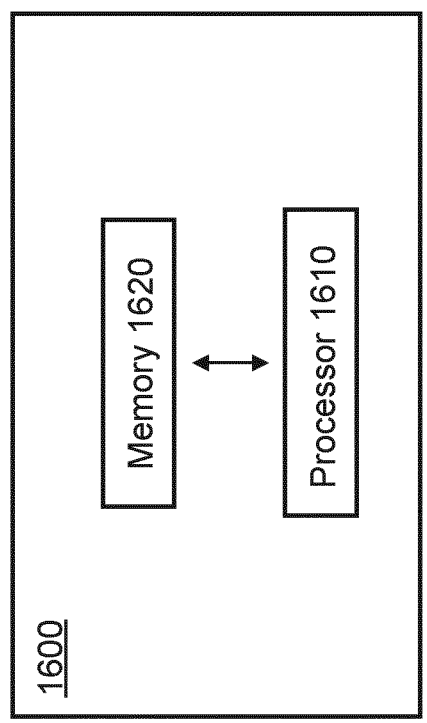
FIG. 16 shows an example embodiment of an apparatus.

FIG. 16 shows an example embodiment of an apparatus 1600, which may be a node, host or server in a communications network or serving such a network. For example, the apparatus 1600 may be a base station, a Node B, an evolved Node B (eNB), 5G Node B or access point, next generation Node B (NG-NB or gNB), WLAN access point, mobility management entity (MME), and/or subscription server associated with a radio access network (RAN) such as a GSM network, LTE network, 5G or NR. In the example case where the apparatus 1600 is a gNB, it may be configured in a central unit (CU) and distributed unit (DU) architecture that divides the gNB functionality. As shown, the apparatus 1600 may comprise at least one processor 1610 and at least one memory 1620 including computer code for one or more programs. The apparatus 1600 may be configured to cause one or more of the steps of any of the methods of any of the disclosed embodiments to be performed.

Alternatively or additionally, some embodiments may be implemented using circuitry.

The circuitry may be configured to perform one or more of the functions and/or method steps previously described. That circuitry may be included in an apparatus such as, e.g., the apparatus 1600.

As used in the present application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:
1. A method, comprising:
providing at a source domain, a pre-trained neural network model within a source agent and within a source environment, with an input beam feature, the pre-trained neural network model comprising a first set of layers and a second set of layers;

when the source environment has been changed into a target environment, reusing, at a target domain, the first set of layers within the source agent;
when a knowledge of the source agent is to be transferred to a target agent, transferring a predetermined number of layers amongst the first set of layers within the source agent at the source domain to the target agent at the target domain, wherein
the predetermined number of layers to be transferred among the first set of layers is determined based on a similarity analysis between environment features at the source domain and at the target domain;
determining whether, for the target domain, to maintain the second set of layers from the source domain or modify the second set of layers from the source domain or replace the second set of layers from the source domain with a third set of layers; and
in response to said determining, training at the target domain, either the maintained second set of layers or the modified second set of layers or the third set of layers, using collected data from at least the target domain, wherein:
the pre-trained neural network model has been previously trained to learn a non-discounted cumulative reward Q (s, a) to evaluate a benefit of including a given beam into a grid-of-beams (GoB), where the term "s" denotes a state indicating a status of a grid-of-beams (GoB) in terms of selected and non-selected beams in the grid-of-beams (GoB) under construction and the term "a" denotes an action corresponding to a selection of one additional beam from an universal beam set U;
the pre-trained neural network model is applied to select at least one beam to include in the grid-of-beams (GoB) to optimize a performance metric; and
the pre-trained neural network model is repeatedly applied until a required number of beams for the grid-of-beams is selected.

2. The method of claim 1, wherein:
said determining comprises a heuristic determination; and
maintaining the second set of layers from the source domain comprises reusing all layers of the second set of layers, and modifying the second set of layers from the source domain comprises modifying at least one layer of the second set of layers, and/or removing at least one layer of the second set of layers, and/or adding at least one layer to the second set of layers.

3. The method of claim 1, wherein the first set of layers comprises low and medium layers and the second set of layers comprises high layers.

4. The method of claim 1, wherein each layer of the pre-trained neural network model is respectively defined by a set of parameters and hyperparameters.

5. The method of claim 1, wherein the environment features comprise at least one of a temporal traffic distribution, a spatial traffic distribution and received spatially dependent antenna gains from the beams.

6. The method of claim 1, wherein the pre-trained neural network model has been previously trained using collected network data and/or simulated data from a network simulator.

7. An apparatus, comprising:
at least one processor; and
at least one memory including computer program code,
wherein the at least one memory and the computer program code are configured, with the at least one processor, to cause the apparatus at least to perform the method of claim 1.

8. A non-transitory computer-readable medium encoded with program instructions that, when executed on an apparatus, cause the apparatus to perform the method of claim 1.

9. A method, comprising:
providing at a source domain, a pre-trained neural network model with at least an input beam feature and an input environment feature;
modifying structurally the pre-trained neural network model depending on a format of the input beam and environment features, as to obtain a teacher model at the source domain;
training the teacher model using at least the input beam and environment features from the source domain, as to obtain a trained teacher model;
constructing a smaller pre-trained neural network model as a student model;
training the student model, as to obtain a trained student model, using at least the input beam and environment features from the source domain and an output of the trained teacher model, to mimic the output of the trained teacher model; and
fine-tuning the trained student model using at least input beam and environment features from a target domain, wherein:
the pre-trained neural network model has been previously trained to learn a non-discounted cumulative reward Q (a, a) to evaluate a benefit of including a given beam into a grid-of-beams (GoB), where the term "s" denotes a state indicating a status of a grid-of-beams (GoB) in terms of selected and non-selected beams in the grid-of-beams (GoB) under construction and the term "a" denotes an action corresponding to a selection of one additional beam from a universal beam set U;
the pre-trained neural network model is applied to select at least one beam to include in the grid-of-beams (GoB) to optimize a performance metric; and
the pre-trained neural network model is repeatedly applied until a required number of beams for the grid-of-beams is selected.

10. The method of claim 9, wherein to mimic the output of the trained teacher model comprises minimizing at least one loss function between the trained teacher model and the student model using the input beam and environment features from the source domain and the output of the trained teacher model.

11. The method of claim 10, wherein the loss function comprises at least a model similarity transfer loss.

12. The method of claim 11, wherein said fine-tuning the trained student model comprises at least: training a selected number of last layers of the trained student model using the input beam and environment features from the target domain, and jointly minimizing the model similarity transfer loss and a deep Q-network (DQN) approximation loss between the trained teacher model and the trained student model.

13. The method of claim 12, wherein the number of last layers to be trained is selected using a similarity analysis between the source domain and the target domain.

14. The method of claim 9, wherein the input beam feature and the input environment feature have a different format or a similar format with a size being either similar or different.

15. The method of claim 9, wherein the input environment feature comprises at least one of a temporal traffic distribution, a spatial traffic distribution and received spatially dependent antenna gains from the beams.

16. An apparatus comprising:
at least one processor; and
at least one memory including computer program code, wherein the at least one memory and the computer program code are configured, with the at least one processor, to cause the apparatus at least to perform the method of claim 6.

17. A non-transitory computer-readable medium encoded with program instructions that, when executed on an apparatus, cause the apparatus to perform the method of claim 6.

* * * * *